(12) United States Patent
Rosenberg et al.

(10) Patent No.: US 11,477,139 B2
(45) Date of Patent: Oct. 18, 2022

(54) TECHNIQUES FOR MESSAGING BOT RICH COMMUNICATION

(71) Applicant: Meta Platforms, Inc., Menlo Park, CA (US)

(72) Inventors: Seth Garrett Steinberg Rosenberg, San Francisco, CA (US); Matthew Steiner, Los Altos, CA (US); Ilya Sukhar, San Francisco, CA (US); Pooya Karimian, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 433 days.

(21) Appl. No.: 15/054,103

(22) Filed: Feb. 25, 2016

(65) Prior Publication Data

US 2017/0250936 A1    Aug. 31, 2017

(51) Int. Cl.
   *G06F 15/16*   (2006.01)
   *H04L 51/02*   (2022.01)
   *H04L 51/18*   (2022.01)

(52) U.S. Cl.
   CPC .............. *H04L 51/02* (2013.01); *H04L 51/18* (2013.01)

(58) Field of Classification Search
   None
   See application file for complete search history.

(56) References Cited

U.S. PATENT DOCUMENTS

| | | | |
|---|---|---|---|
| 8,682,802 B1 | 3/2014 | Kannanari | |
| 8,701,020 B1 | 4/2014 | Fulcher et al. | |
| 8,737,579 B2* | 5/2014 | Johnson | G06F 9/544 379/67.1 |
| 2004/0205772 A1* | 10/2004 | Uszok | H04L 29/06 719/317 |
| 2006/0259555 A1 | 11/2006 | Hassounah et al. | |
| 2007/0198474 A1* | 8/2007 | Davidson | G06Q 10/107 |
| 2008/0268960 A1* | 10/2008 | Farrier | A63F 13/12 463/42 |

(Continued)

FOREIGN PATENT DOCUMENTS

| | | | |
|---|---|---|---|
| CN | 1756172 A | 4/2006 | |
| CN | 101789008 A | 7/2010 | |

(Continued)

OTHER PUBLICATIONS

Extended European Search Report received for European Patent Application No. 16183958.4, dated Jul. 14, 2017, 7 pages.

(Continued)

*Primary Examiner* — Padma Mundur
(74) *Attorney, Agent, or Firm* — Fenwick & West LLP

(57) ABSTRACT

Techniques for messaging bots with rich communication are described. In one embodiment, an apparatus may comprise a messaging component operative to receive a message from a client device; and add the message to a message queue; a message queue monitoring component operative to monitor the message queue; detect that the message indicates messaging bot invocation; and submit the message to a bot framework component based on detecting that the message indicates messaging bot invocation; and the bot framework component operative to determine a messaging bot associated with the message; and submit the message to the messaging bot. Other embodiments are described and claimed.

15 Claims, 31 Drawing Sheets

(56) References Cited

U.S. PATENT DOCUMENTS

| | | | |
|---|---|---|---|
| 2009/0176511 A1* | 7/2009 | Morrison | G06Q 30/02 |
| | | | 455/456.3 |
| 2009/0177749 A1 | 7/2009 | McLean et al. | |
| 2011/0213846 A1 | 9/2011 | Sarin et al. | |
| 2013/0144961 A1* | 6/2013 | Park | H04L 51/046 |
| | | | 709/206 |
| 2013/0198296 A1 | 8/2013 | Roy et al. | |
| 2014/0122619 A1 | 5/2014 | Duan | |
| 2014/0164508 A1* | 6/2014 | Lynch | H04L 29/08081 |
| | | | 709/204 |
| 2014/0164953 A1 | 6/2014 | Lynch et al. | |
| 2014/0280522 A1 | 9/2014 | Watte | |
| 2014/0325387 A1 | 10/2014 | Martin et al. | |
| 2015/0044987 A1 | 2/2015 | Menon et al. | |
| 2015/0095823 A1 | 4/2015 | Brewer et al. | |
| 2015/0317078 A1* | 11/2015 | Kocienda | G06F 3/0237 |
| | | | 715/773 |
| 2015/0341292 A1 | 11/2015 | Ahmed | |
| 2016/0044380 A1 | 2/2016 | Barrett | |
| 2016/0292020 A1 | 10/2016 | Caron | |

FOREIGN PATENT DOCUMENTS

| | | |
|---|---|---|
| CN | 104813311 A | 7/2015 |
| JP | 2004342095 A | 12/2004 |
| JP | 2014142919 A | 8/2014 |
| KR | 10-2015-0037804 | 4/2015 |

OTHER PUBLICATIONS

International Search Report and Written Opinion received for PCT Patent Application No. PCT/US2016/019969, dated Nov. 21, 2016, 15 pages.

* cited by examiner

*1300*

Receive a messaging bot invocation in a message thread display on a client device.
*1302*

Invoke a messaging bot interaction user interface on the client device in combination with the message thread display in response to the messaging bot invocation.
*1304*

Receive a messaging bot interaction command via the messaging bot interaction user interface.
*1306*

Transmit the messaging bot interaction command from the client device to a messaging system.
*1308*

Receive a messaging bot interaction response from the messaging system at the client device.
*1310*

Display the messaging bot interaction response in the message thread display.
*1312*

*FIG. 13A*

TECHNIQUES FOR MESSAGING BOT RICH COMMUNICATION

RELATED APPLICATIONS

This application is related to a U.S. patent application Ser. No. 15/054,101 "Techniques for Messaging Bot App Interactions,", filed on Feb. 25, 2016, which is hereby incorporated by reference in its entirety.

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques for messaging bots. Some embodiments are particularly directed to techniques for messaging bots with interactions within a messaging app. Some embodiments are particularly directed to techniques for messaging bots using rich communication over a messaging system.

In one embodiment, for example, an apparatus may comprise a user interface component operative to receive a messaging bot invocation in a message thread display on a client device; invoke a messaging bot interaction user interface on the client device in combination with the message thread display in response to the messaging bot invocation; receive a messaging bot interaction command via the messaging bot interaction user interface; and display a messaging bot interaction response in the message thread display; and a client messaging component operative to transmit the messaging bot interaction command from the client device to a messaging system; and receive the messaging bot interaction response from the messaging system at the client device. Other embodiments are described and claimed.

In another embodiment, for example, an apparatus may comprise a messaging component operative to receive a message from a client device; and add the message to a message queue; a message queue monitoring component operative to monitor the message queue; detect that the message indicates messaging bot invocation; and submit the message to a bot framework component based on detecting that the message indicates messaging bot invocation; and the bot framework component operative to determine a messaging bot associated with the message; and submit the message to the messaging bot. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment according to the invention a computer-implemented method comprises:
  receiving a message from a client device;
  adding the message to a message queue;
  monitoring the message queue;
  detecting that the message indicates messaging bot invocation; and
  submitting the message to a bot framework component based on detecting that the message indicates messaging bot invocation;
  determining a messaging bot associated with the message; and
  submitting the message to the messaging bot.

In an embodiment according to the invention, a computer-implemented method, comprises:
receiving, at a messaging server, a mail server, and/or at a messaging component of a client front-end server of a messaging system, a message from a client device;
adding the message to a message queue;
monitoring, by a message queue monitoring component of a worker server of the messaging system, the message queue;
detecting that the message indicates messaging bot invocation, wherein the message queue monitoring component is configured to examine each entry within the message queue and to detect that the message indicates a messaging bot invocation; and
submitting, by the message queue monitoring component, the message or a notification that a message with a messaging bot invocation was detected, such as an identifier for the message, to a bot framework component based on detecting that the message indicates messaging bot invocation;
by the bot framework component:
determining a messaging bot associated with the message; and
  submitting the message to the messaging bot.

In an embodiment according to the invention, wherein the message may comprise a text content portion, a method may comprise:

detecting a bot invocation symbol in the text content portion of the message; and detecting that the message indicates messaging bot invocation based on detecting the bot invocation symbol.

In an embodiment according to the invention, wherein the message may comprise a text content portion, a method may comprise:

detecting a bot invocation symbol in the text content portion of the message; and detecting that the message indicates messaging bot invocation based on detecting the bot invocation symbol, and/or wherein the message including information for a bot is flagged by a sender client device in that a metadata portion of the message is flagged with a bot invocation flag, and wherein the message monitoring component is configured to detect that the message indicates messaging bot invocation based on detecting the bot invocation flag.

In an embodiment according to the invention, a method may comprise:

receiving a messaging bot response to the message; and inserting the messaging bot response in the message queue.

In an embodiment according to the invention, a method may comprise: receiving a messaging bot response to the message; and inserting the messaging bot response in the message queue, and optionally transmitting the messaging bot response to the client device for display on a display of a messaging client.

In an embodiment according to the invention, wherein the message may be associated with a message thread, the messaging bot response inserted in the message queue may be marked for display in the message thread.

In an embodiment according to the invention, wherein the message may be associated with a message thread, the messaging bot response inserted in the message queue may be marked for display in the message thread, wherein, optionally, the message bot is permitted to add messages to the message queue in response to a message sent out by the user to the message bot, the message bot further optionally may be authorized to send a single response to the message and/or authorized for a limited period of time in response to the message.

In an embodiment according to the invention, wherein the message may comprise a text portion, the text portion comprising a bot alias text segment, further may comprise:

receiving an alias initial portion of the bot alias text segment;

matching the alias initial portion against a bot alias registry to determine one or more predicted bot alias text segments, the one or more predicted bot alias text segments comprising the bot alias text segment; and transmitting the one or more predicted bot alias text segments to the client device.

In an embodiment according to the invention, wherein the message may comprising a text portion, the text portion comprising a bot command text segment, further may comprise, optionally by the bot framework component:

receiving a command initial portion of the bot command text segment;

submitting the command initial portion to the messaging bot;

receiving one or more predicted bot command text segments from the messaging bot, the one or more predicted bot command text segments comprising the bot command text segment; and transmitting the one or more predicted bot command text segment to the client device.

In an embodiment according to the invention, wherein the message may be associated with a message thread, the message comprising a bot subscription command, further may comprise:

subscribing the message thread to the messaging bot in response to the bot subscription command;

receiving a broadcast message from the messaging bot;

determining a plurality of subscriber threads for the broadcast message based on the messaging bot, the plurality of subscriber threads comprising the message thread;

dividing the plurality of subscriber threads into a plurality of subscriber thread chunks;

assigning each of the plurality of subscriber threads chunks to a broadcast worker of a plurality of broadcast workers; and adding the broadcast message to a plurality of message queues based on the plurality of subscriber threads chunks by the plurality of broadcast workers, the plurality of message queues comprising the message queue.

In an embodiment according to the invention, an apparatus, comprises:

a processor circuit on a device;

a messaging component operative on the processor circuit to receive a message from a client device; and add the message to a message queue;

a message queue monitoring component operative to monitor the message queue; detect that the message indicates messaging bot invocation; and submit the message to a bot framework component based on detecting that the message indicates messaging bot invocation; and the bot framework component operative to determine a messaging bot associated with the message; and submit the message to the messaging bot.

In an embodiment according to the invention, an apparatus, wherein the message comprises a text content portion, further may comprising:

the message queue monitoring component operative to detect a bot invocation symbol in the text content portion of the message; and detect that the message indicates messaging bot invocation based on detecting the bot invocation symbol.

In an embodiment according to the invention, an apparatus further may comprise:

the bot framework component operative to receive a messaging bot response to the message; and insert the messaging bot response in the message queue.

In an embodiment according to the invention, an apparatus, wherein the message may be associated with a message thread, the messaging bot response may be inserted in the message queue marked for display in the message thread.

In an embodiment according to the invention, an apparatus, wherein the message may comprising a text portion, the text portion comprising a bot alias text segment, further may comprise:

the bot framework component operative to receive an alias initial portion of the bot alias text segment; match the alias initial portion against a bot alias registry to determine one or more predicted bot alias text segments, the one or more predicted bot alias text segments comprising the bot alias text segment; and transmit the one or more predicted bot alias text segments to the client device.

In an embodiment according to the invention, an apparatus, wherein the message may comprise a text portion, the text portion comprising a bot command text segment, further may comprise:

the bot framework component operative to receive a command initial portion of the bot command text segment; submit the command initial portion to the messaging bot; receive one or more predicted bot command text segments from the messaging bot, the one or more predicted bot command text segments comprising the bot command text segment; and transmit the one or more predicted bot command text segment to the client device.

In an embodiment according to the invention, an apparatus, wherein the message may be associated with a message thread, the message comprising a bot subscription command, further may comprise:

the bot framework component operative to subscribe the message thread to the messaging bot in response to the bot subscription command;

a broadcast component operative to receive a broadcast message from the messaging bot; determine a plurality of subscriber threads for the broadcast message based on the messaging bot, the plurality of subscriber threads comprising the message thread; divide the plurality of subscriber threads into a plurality of subscriber thread chunks; and assign each of the plurality of subscriber threads chunks to a broadcast worker of a plurality of broadcast workers; and the plurality of broadcast workers operative to add the broadcast message to a plurality of message queues based on the plurality of subscriber threads chunks, the plurality of message queues comprising the message queue.

In an embodiment according to the invention, at least one computer-readable storage medium may comprise instructions that, when executed, may cause a system to:

receive a message from a client device;

add the message to a message queue;

monitor the message queue;

detect that the message indicates messaging bot invocation; and submit the message to a bot framework component based on detecting that the message indicates messaging bot invocation;

determine a messaging bot associated with the message; and submit the message to the messaging bot.

In an embodiment according to the invention, a computer-readable storage medium, wherein the message may comprise a text content portion, may comprise further instructions that, when executed, cause a system to:

detect a bot invocation symbol in the text content portion of the message; and detect that the message indicates messaging bot invocation based on detecting the bot invocation symbol.

In an embodiment according to the invention, a computer-readable storage medium, wherein the message may be associated with a message thread, may comprise further instructions that, when executed, may cause a system to:

receive a messaging bot response to the message; and insert the messaging bot response in the message queue marked for display in the message thread.

In an embodiment according to the invention, a computer-readable storage medium, wherein the message may comprise a text portion, the text portion comprising a bot alias text segment, may comprise further instructions that, when executed, may cause a system to:

receive an alias initial portion of the bot alias text segment;

match the alias initial portion against a bot alias registry to determine one or more predicted bot alias text segments, the one or more predicted bot alias text segments comprising the bot alias text segment; and transmit the one or more predicted bot alias text segments to the client device.

In an embodiment according to the invention, a computer-readable storage medium, wherein the message may comprise a text portion, the text portion may comprise a bot command text segment, comprising further instructions that, when executed, may cause a system to:

receive a command initial portion of the bot command text segment;

submit the command initial portion to the messaging bot;

receive one or more predicted bot command text segments from the messaging bot, the one or more predicted bot command text segments comprising the bot command text segment; and transmit the one or more predicted bot command text segment to the client device.

In an embodiment according to the invention, a computer-readable storage medium, wherein the message may be associated with a message thread, the message comprising a bot subscription command, may comprising further instructions that, when executed, may cause a system to:

subscribe the message thread to the messaging bot in response to the bot subscription command;

receive a broadcast message from the messaging bot;

determine a plurality of subscriber threads for the broadcast message based on the messaging bot, the plurality of subscriber threads comprising the message thread;

divide the plurality of subscriber threads into a plurality of subscriber thread chunks;

assign each of the plurality of subscriber threads chunks to a broadcast worker of a plurality of broadcast workers; and add the broadcast message to a plurality of message queues based on the plurality of subscriber threads chunks by the plurality of broadcast workers, the plurality of message queues comprising the message queue.

In a further embodiment according to the invention, one or more computer-readable non-transitory storage media embody software that is operable when executed to perform a method according to the invention or any of the above mentioned embodiments.

In a further embodiment according to the invention, a system comprises: one or more processors; and at least one memory coupled to the processors and comprising instructions executable by the processors, the processors operable when executing the instructions to perform a method according to the invention or any of the above mentioned embodiments.

In a further embodiment according to the invention, a computer program product, preferably comprising a computer-readable non-transitory storage media, is operable when executed on a data processing system to perform a method according to the invention or any of the above mentioned embodiments.

BRIEF DESCRIPTION OF THE DRAWINGS

FIG. 13A illustrates an embodiment of a first logic flow for the system of FIG. 1.

DETAILED DESCRIPTION

Figure 1:
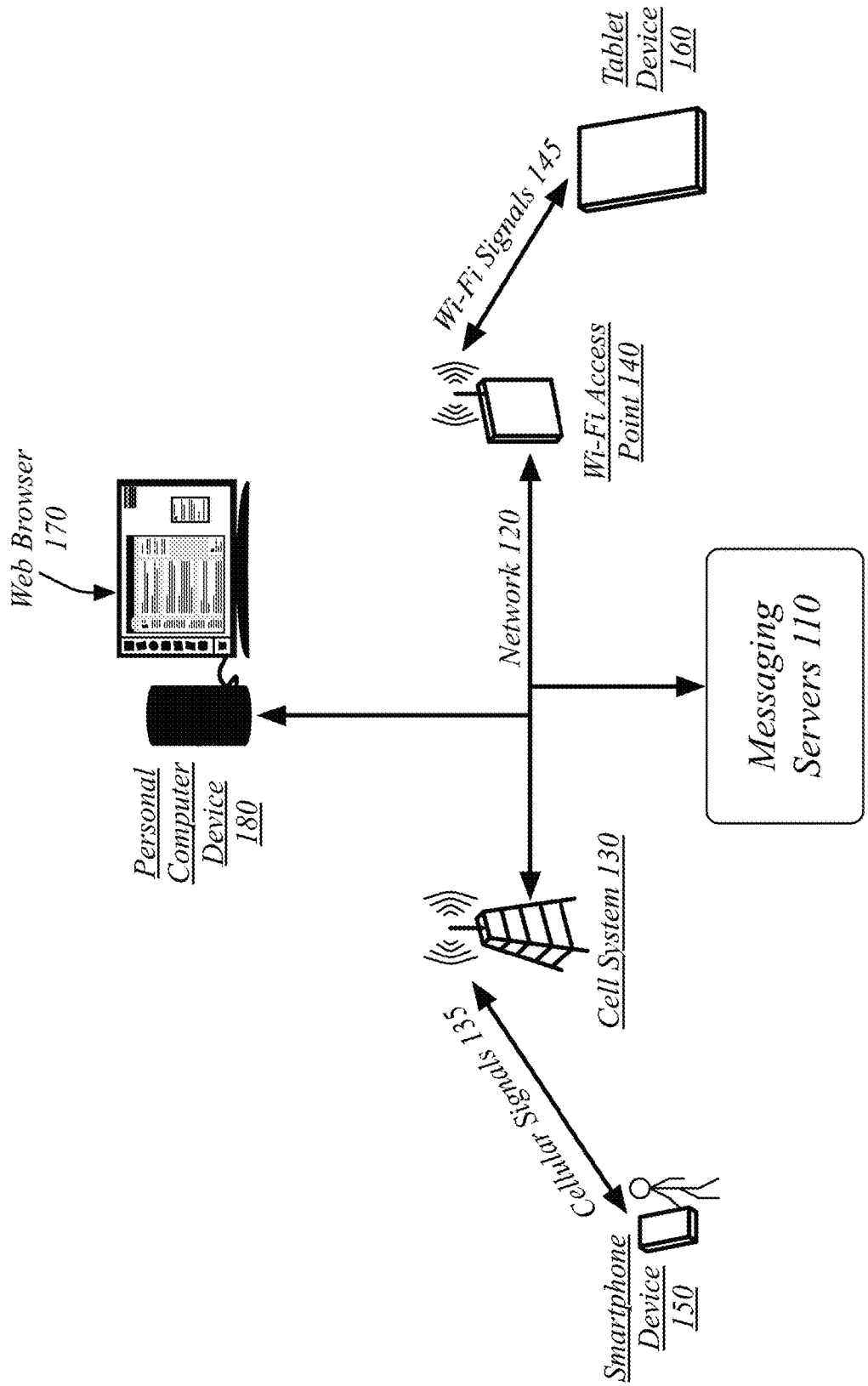
FIG. 1 illustrates an embodiment of a messaging system.

Network-connected computing devices can provide their users with an unprecedented ability to engage in interpersonal communication. People may engage in messaging interactions with their friends, family, coworkers, and other associates. A user's message exchanges with their contacts may each be maintained within a distinct message thread.

These network-connected computing devices can also provide their users with access to network-accessible services. For instance, transportation services, dining services, entertainment services, and other services may use web sites, web application, client applications, or other network-accessibility techniques to empower people to use their client devices to engage with their services. In some cases, such as some entertainment or media services, the service can be both arranged and delivered via the client devices. For example, music may be purchased via a client device and delivered to the client device for playback. In other cases, such as with transportation, dining, and in-person entertainment, the service can be arranged via the client devices, but is performed external to the client device. For example, a ride-sharing service may be arranged via a client device but performed through a vehicle and driver providing ride sharing to the user.

In some cases, the use of a network-accessible service may relate to more than one person. Particularly where a user's access to the service is a client device that they also use for messaging, a user may benefit from sharing their engagement with the network-accessible service in the messaging client with the others to whom the service relates. As such, message threads may act as hubs for a user's online social relationship with their contacts, with the message threads incorporating services requested, monitored, or engaged with via the same client used for messaging.

To aid a user in interacting with a service via a messaging context, services may be represented as messaging bots within a messaging system. A messaging bot may be a fully or partially automated front-end to a network-accessible service that can be represented as a participant within a message thread. In some cases, a messaging bot may be corresponded with in a message thread that explicitly includes the messaging bot, such as a one-on-one message thread between a particular user and the messaging bot. In other cases, a messaging bot may be corresponded with in a message thread in which the messaging bot is not a regular participant, the messaging bot a temporary participant in the message thread for the purposes of interacting with the service. The messaging bot may be included as a temporary participant in any other thread, whether a one-on-one thread between two users or a group thread between multiple users.

As such, a user may engage with network services within the familiar experience of a messaging client. Further, by using a messaging client, a user may engage with network services within a messaging context so as to allow the inclusion of other people. In some cases, this may simply inform the other people as to the services, such as letting friends or family know about transportation details. In other cases, this may empower the performance of services for multiple people, such as where dinner, a ride, entertainment, or other service is arranged for the use of multiple people. As a result, the embodiments can improve the experience of using network-accessible services and can extend the reach of network-accessible services to the user of a messaging system.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a messaging system 100. In one embodiment, the messaging system 100 may comprise a computer-implemented system having software applications comprising one or more components. Although the messaging system 100 shown in FIG. 1 has a limited number of elements in a certain topology, it may be appreciated that the messaging system 100 may include more or less elements in alternate topologies as desired for a given implementation.

The messaging servers 110 may comprise one or more messaging servers operated by a messaging platform as part of the messaging system 100. A messaging server may comprise an Internet-accessible server, with the network 120 connecting the various devices of the messaging system 100 comprising, at least in part, the Internet.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging platform including the messaging servers 110. A dedicated messaging client may be a general client operative to work with a plurality of different messaging providers including the messaging provider administering the messaging platform including the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for the social networking service, with the computing device providing additional functionality of the social networking service. Similarly, the social networking application may provide both messaging functionality and additional social networking functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging servers 110 due to it not maintaining or otherwise not having access to an existing state for the message inbox. The web browser 170 may then retrieve incremental updates for any new changes to the state of the message inbox so long as it maintains a user session with the messaging servers 110, discarding its known state for the message inbox at the end of the session, such as when the web browser 170 is closed by the user. Without limitation, an update may correspond to the addition of a message to a mailbox, a deletion of a message from a mailbox, and a read receipt.

A messaging system 100 may operate by defining a messaging inbox as comprising a plurality of messages, wherein each message is an individual transaction of communication between two or more participants. A mail server may operate by maintaining a message index for the messaging inbox. Mail servers may receive messages and store the messages in mail archives from which messages may be retrieved through reference to the message index. Mail clients may connect to the mail servers and retrieve messages that have been added to their mail archive since their last update. The mail clients may receive a mail index from the mail archive indicating what messages are stored in the mail archive. The mail clients may compare the mail archive to their current inbox in order to determine what messages they are missing, which they then request from the mail archive. The mail clients may make changes to their inbox, which results in mail inbox instructions being transmitted to the mail archives instructing the mail archives in modifications to make to the representation of their mail inbox on the mail archives.

Messaging interactions mediated by a messaging system may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members.

The messaging system 100 may use knowledge generated from interactions in between users. The messaging system 100 may comprise a component of a social-networking system and may use knowledge generated from the broader interactions of the social-networking system. As such, to protect the privacy of the users of the messaging system 100 and the larger social-networking system, messaging system 100 may include an authorization server (or other suitable component(s)) that allows users to opt in to or opt out of having their actions logged by the messaging system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the messaging system 100 and other elements of a social-networking system through blocking, data hashing, anonymization, or other suitable techniques as appropriate.

Figure 2:
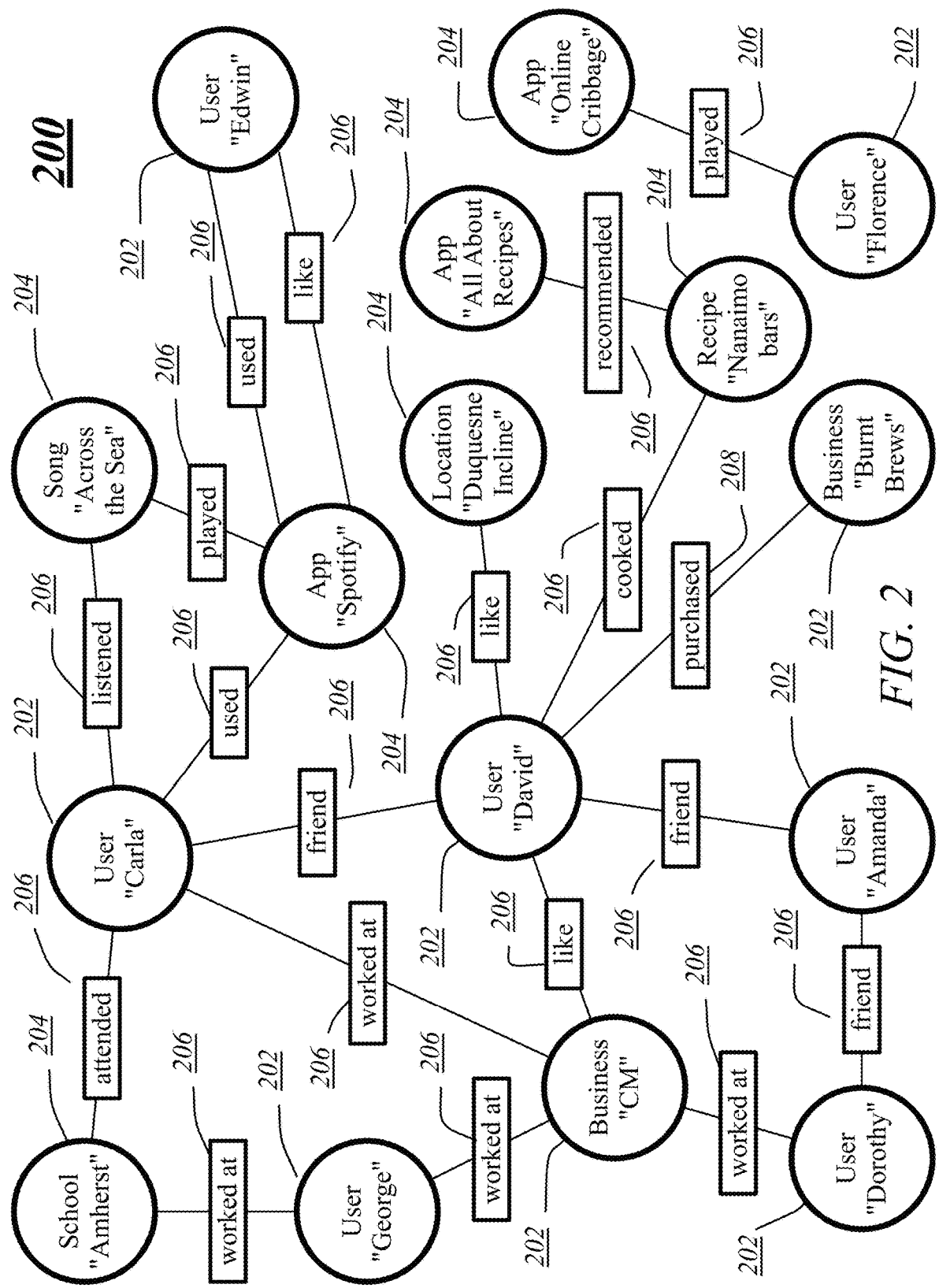
FIG. 2 illustrates an example of a social graph.

FIG. 2 illustrates an example of a social graph 200. In particular embodiments, a social-networking system may store one or more social graphs 200 in one or more data stores as a social graph data structure.

In particular embodiments, social graph 200 may include multiple nodes, which may include multiple user nodes 202 and multiple concept nodes 204. Social graph 200 may include multiple edges 206 connecting the nodes. In particular embodiments, a social-networking system, client system, third-party system, or any other system or device may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of the social-networking system. As an example and not by way of limitation, a user may be an individual (human user), an entity (e.g., an enterprise, business, or third-party application), or a group (e.g., of individuals or entities) that interacts or communicates with or over the social-networking system. In particular embodiments, when a user registers for an account with the social-networking system, the social-networking system may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system. In particular embodiments, a user node 202 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages. A user node 202 may be associated with a unique user identifier for the user in the social-networking system.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. A business page such as business page 205 may comprise a user-profile page for a commerce entity. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 206 connecting the first user's user node 202 to the second user's user node 202 in social graph 200 and store edge 206 as social-graph information in one or more data stores. In the example of FIG. 2, social graph 200 includes an edge 206 indicating a friend relation between user nodes 202 of user "Amanda" and user "Dorothy." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Across the Sea"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "Edwin" and concept node 204 for "SPOTIFY").

In particular embodiments, the social-networking system may create an edge 206 between a user node 202 and a concept node 204 in social graph 200. As an example and not by way of limitation, a user viewing a concept-profile page (such as, for example, by using a web browser or a special-purpose application hosted by the user's client system) may indicate that he or she likes the concept represented by the concept node 204 by clicking or selecting a "Like" icon, which may cause the user's client system to send to the social-networking system a message indicating the user's liking of the concept associated with the concept-profile page. In response to the message, the social-networking system may create an edge 206 between user node 202 associated with the user and concept node 204, as illustrated by "like" edge 206 between the user and concept node 204. In particular embodiments, the social-networking system may store an edge 206 in one or more data stores. In particular embodiments, an edge 206 may be automatically formed by the social-networking system in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

The social graph 200 may further comprise a plurality of product nodes. Product nodes may represent particular products that may be associated with a particular business. A business may provide a product catalog to the consumer-to-business service 110 and the consumer-to-business service 110 may therefore represent each of the products within the product in the social graph 200 with each product being in a distinct product node. A product node may comprise information relating to the product, such as pricing information, descriptive information, manufacturer information, availability information, and other relevant information. For example, each of the items on a menu for a restaurant may be represented within the social graph 200 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 200. The information for a product node may be manipulated by the social-networking system as a product object that encapsulates information regarding the referenced product.

As such, the social graph 200 may be used to infer shared interests, shared experiences, or other shared or common attributes of two or more users of a social-networking system. For instance, two or more users each having an edge to a common business, product, media item, institution, or other entity represented in the social graph 200 may indicate a shared relationship with that entity, which may be used to suggest customization of a use of a social-networking system, including a messaging system 150, for one or more users.

Figure 3A:
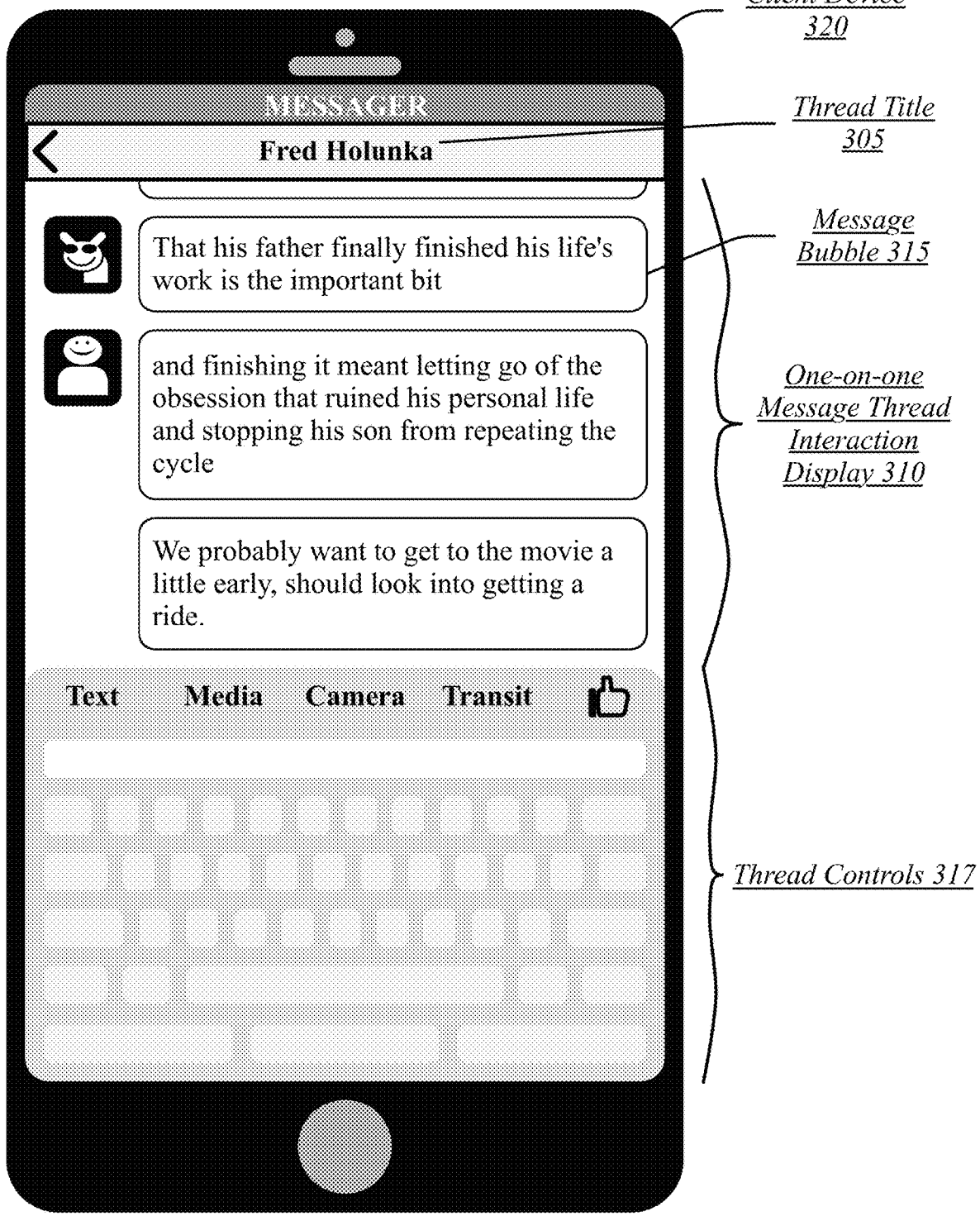
FIG. 3A illustrates an embodiment of a user interface displaying a messaging interface.

FIG. 3A illustrates an embodiment of a user interface 300 displaying a messaging interface on a client device 320.

The user interface 300 may comprise a user interface for a one-on-one message thread. At least a portion of the message exchange for the message thread may be displayed in a one-on-one message thread interaction display 310. A one-on-one message thread interaction display 310 may comprise a display of one or more messages exchanged by the users of the one-on-one message thread.

Each of the one or more messages may be represented by a particular message bubble, such as message bubble 315. A message bubble may represent an atomic messaging interaction. A message bubble may generally correspond to a defined geometric area in which the contents of a particular messaging exchange (e.g., text, media) are contained within the defined geometric area. A message bubble may have a distinct color or plurality of colors (e.g., one or more gradients) that distinguish it from a background of a message thread interaction display. A message bubble may have a distinctly-colored border, such as a black outline as depicted, or may have a border defined by the interface between differing colors of the message bubble and the background. In some embodiments, the color or colors of either or both the message bubbles and the background may be customized and configured by users of the display configuration system 100.

The user interface 300 for a message thread may include thread controls 317. Some portion of the thread controls 317 may be persistently visible during the display of a message thread, such as a control bar empowering access to further user interface controls. Some of the thread controls 317, such as controls in a control bar, may empower access to further user interface controls for the performance of various tasks, such as text entry, media selection, emoji selection, camera use, etc. However, some controls—and in some embodiments precisely one of the thread controls 317— empower the immediate sending of a single icon, such as the social approval icon. One or more of the thread controls 317 may comprise a bot-invocation or service-request control corresponding to a particular messaging bot or service. A portion of the thread controls 317 may comprise text controls for the entry of text. A portion of the thread controls 317 may comprise a text entry display area displaying text that has been entered or otherwise selected by the user, but that has not yet been sent to the other participants in the thread as a message. In some embodiments, text entered or selected for entry in a text entry display area may be communicated to the messaging server 110 of the messaging system 100 for analysis, the providing of suggestions, or other operations.

The user interface 300 may include a thread title 305 listing one or more other users involved in the thread. The thread title 305 may automatically use the name of a user, such as a full name, short name, or other name registered as the name for use with a particular user for messaging and/or social-networking interactions.

Figure 3B:
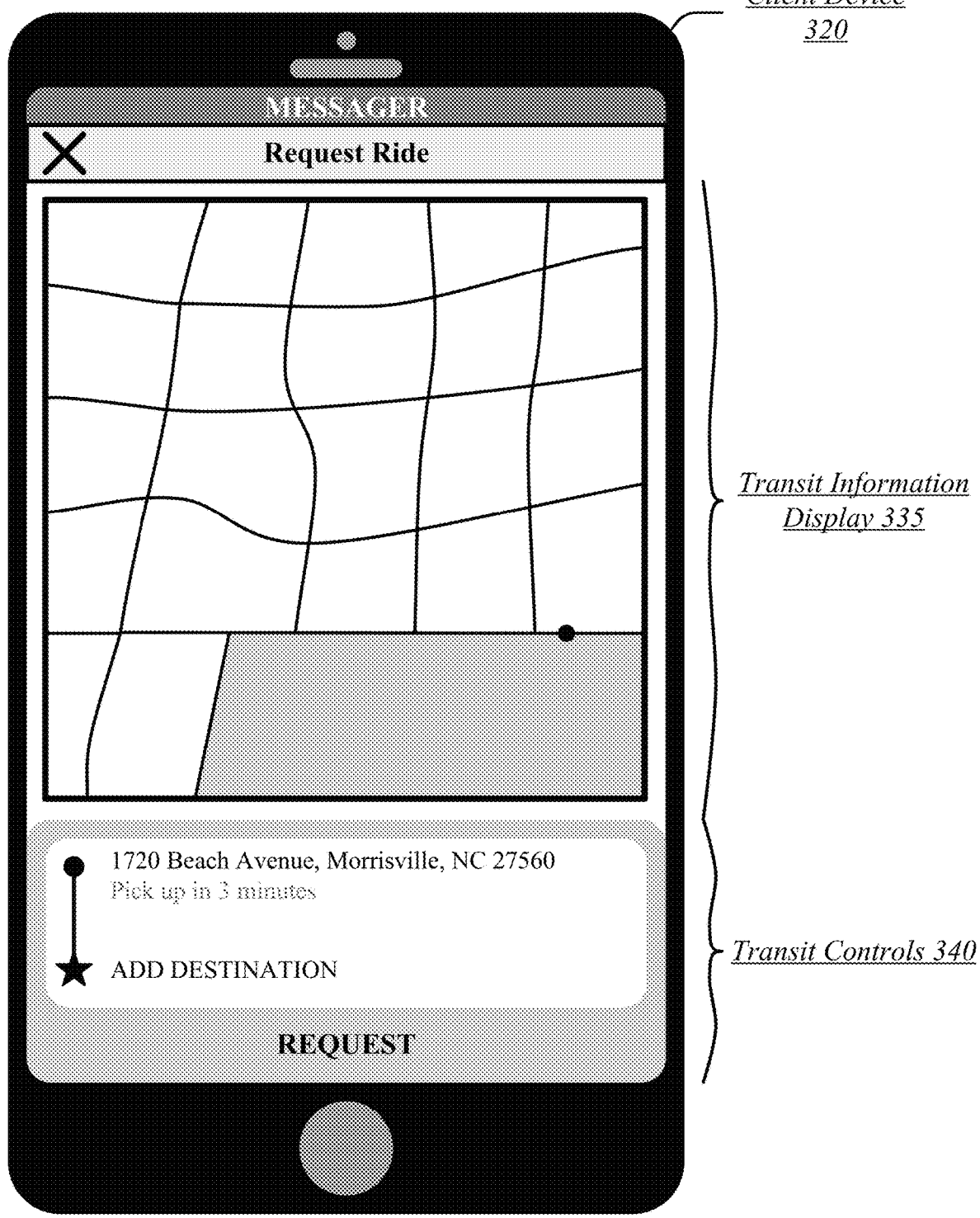
FIG. 3B illustrates an embodiment of a user interface displaying a transit interface.

FIG. 3B illustrates an embodiment of a user interface 325 displaying a transit interface on a client device 320. The transit interface may comprise an element of a messaging client.

A transit interface may be invoked when transit is requested, such as by selecting a transit control. In general, a service-specific interface may be invoked when a service-specific control is invoked. In some cases, a service-specific interface may be specific to a class or type of service, such as local transit (e.g., ride sharing). In other cases, a service-specific interface may be specific to a particular service provider, such as a particular transit provider.

A transit interface may include a transit information display 335, such as a map of the local area of the client device 320 and, by proxy, the user of the client device 320. The transit information display 335 may include a current location of the client device 320, such as may be represented on a map of the local area.

A transit interface may include transit controls 340. Transit controls may empower the specification of a starting location and destination location. Where transit service is being requested, such as in a ride sharing service, a starting location may comprise a location at which a user of the service will be picked up. A destination location may comprise a location to which a user of the service will be delivered. In the illustrated embodiment of FIG. 3B, a starting location has been specified while a destination location has not. The starting location is associated with an estimated pick up time for the requested service. A destination location may be specified if the control reading "ADD DESTINATION" is selected. The starting location may be modified if the control represented by the current starting destination is selected. In some embodiments, a starting location and/or destination location may be specified such as by selecting it on a displayed map. In some embodiments, a displayed map may be zoomed into, zoomed out of, scrolled, or otherwise manipulated.

Figure 3C:
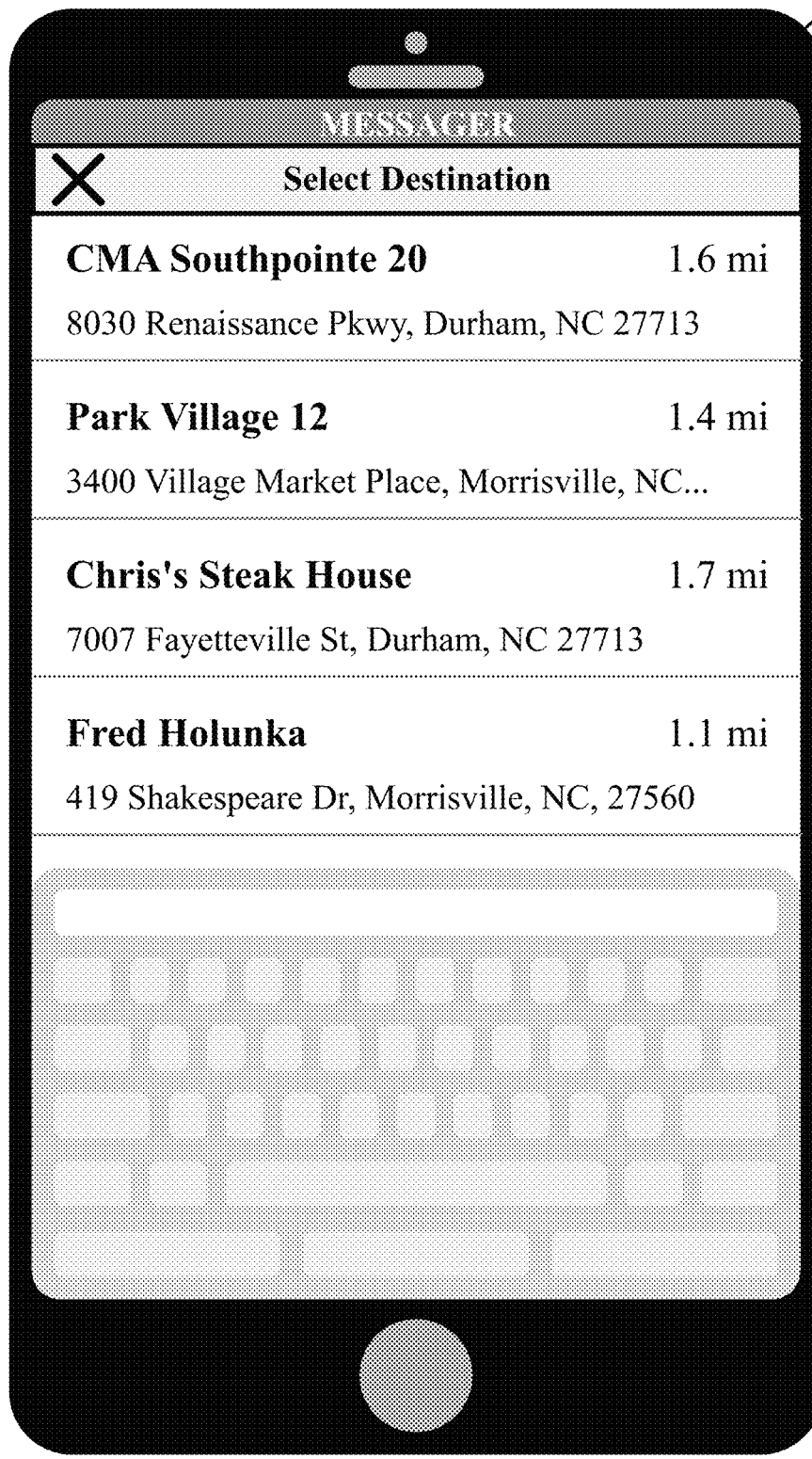
FIG. 3C illustrates an embodiment of a user interface displaying a destination configuration interface.

FIG. 3C illustrates an embodiment of a user interface 350 displaying a destination configuration interface.

Transit configuration controls 355 may comprise a display a plurality of suggested locations. Suggested locations may be determined based on a variety of techniques. In some embodiments, suggested locations may be determined based on the contents of the message thread from which the transit configuration controls 335 are invoked. For instance, locations related to the context of the message thread may be suggested. In the illustrated embodiment, movie theaters may have been suggested in response to the message thread referencing getting to a movie.

In some embodiments, locations may be suggested based on their proximity, with nearer locations promoted over more distant locations. In some embodiments, locations may be suggested based on the history of one or more users involved in the message thread, and in particular the user of the client device 320. For instance, locations recently visited, frequently visited, recently or frequently visited on previous occasions similar to the current occasion (e.g., time of day, day of the week), or otherwise related to a user's history may be suggested. In some embodiments, locations related to one or more users engaged in the message thread, such as addresses of one or more of the users, may be suggested. In some embodiments, locations relevant to one or more other users may be suggested. For instance, where another user is mentioned in a message thread, the address of that user—if made available to the user of the client device 320—may be suggested.

The transit configuration controls 335 may include text entry controls. The suggested locations may be determined at least in part based on text entered using the text entry controls.

Figure 3D:
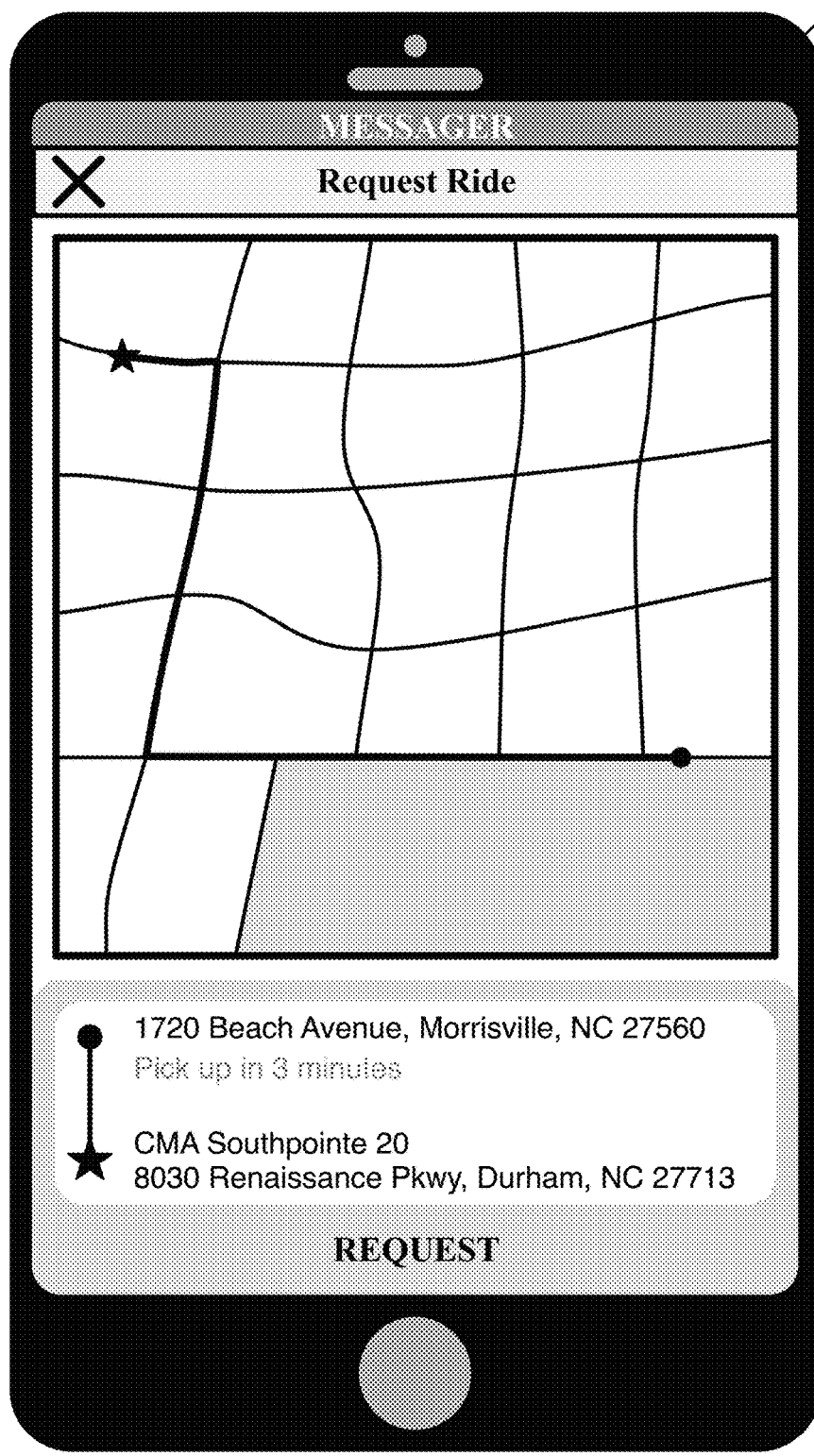
FIG. 3D illustrates an embodiment of a user interface displaying a configured transit request.

FIG. 3D illustrates an embodiment of a user interface 360 displaying a configured transit request.

A configured transit request may include both a starting location and destination location specified. A text version of the starting location and the destination location may be displayed in the updated transit controls 370. The updated transit controls 370 may empower the modification of the starting location and/or the destination location by selecting the currently-configured starting location or destination location. A graphic representation of the starting location and the destination location, as well as a suggested path, may be displayed in the updated transit information 365. In some embodiments, a configured transit request may be displayed in association with an estimated time of travel for the configured trip.

Figure 3E:
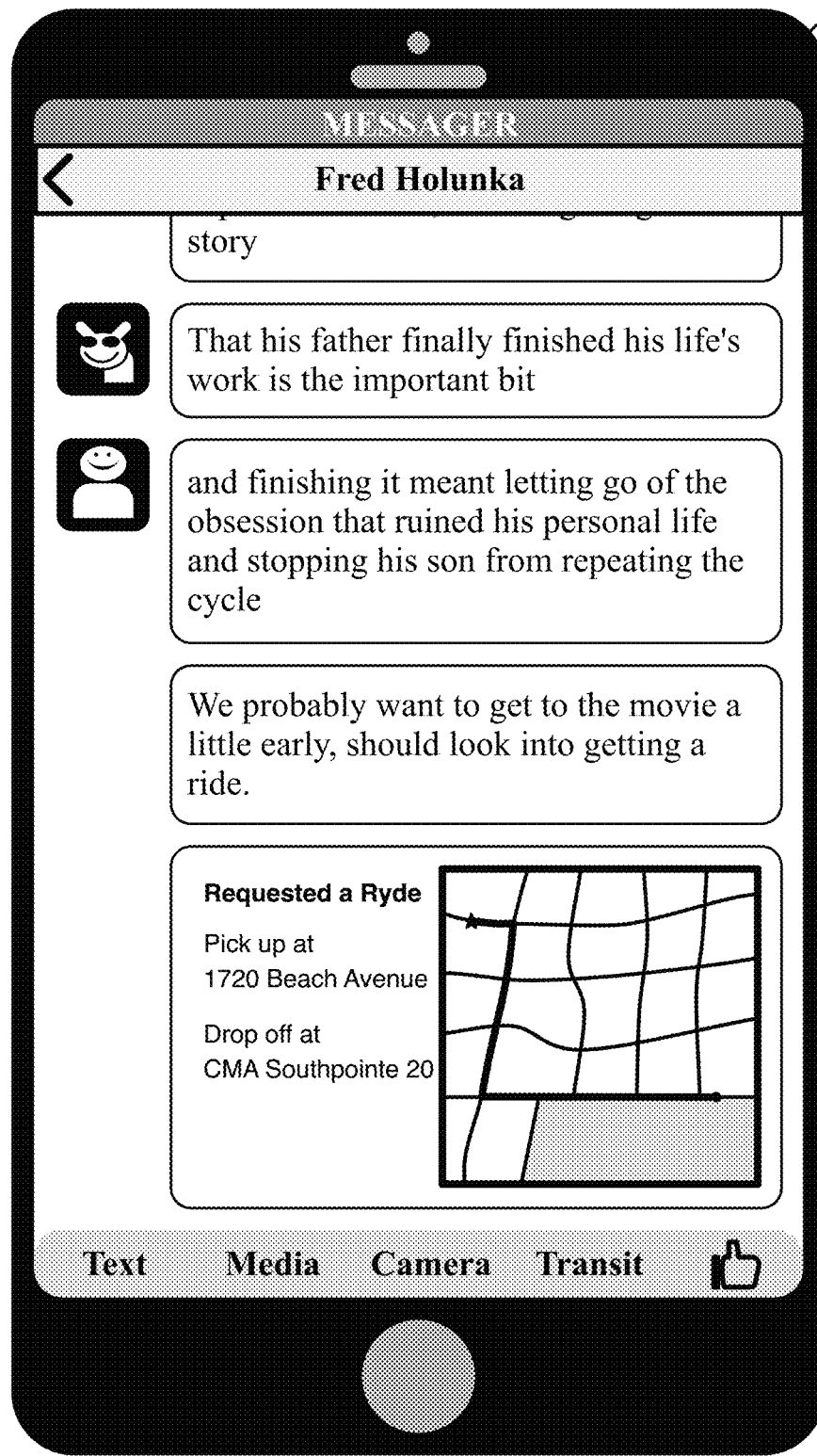
FIG. 3E illustrates an embodiment of a user interface displaying a transit request in a message thread.

FIG. 3E illustrates an embodiment of a user interface 375 displaying a transit request in a message thread.

A configured transit request submitted to a service from a message thread may then be displayed in the message thread. An embodiment of a service request may be generated and added to the sequence of messages of the message thread and transmitted to all of the users engaged in the message thread. Each of the users engaged in the message thread may be provided an in-thread bot request display 385 in their view of the message thread. For a transit request, the in-thread bot request display 385 may comprise a text display of a starting location, a text display of a destination location, a visual representation of a starting location, a visual representation of a destination location, and/or a representation of a suggested route. In general, a request display may include a text descriptor of a requested service.

Figure 4A:
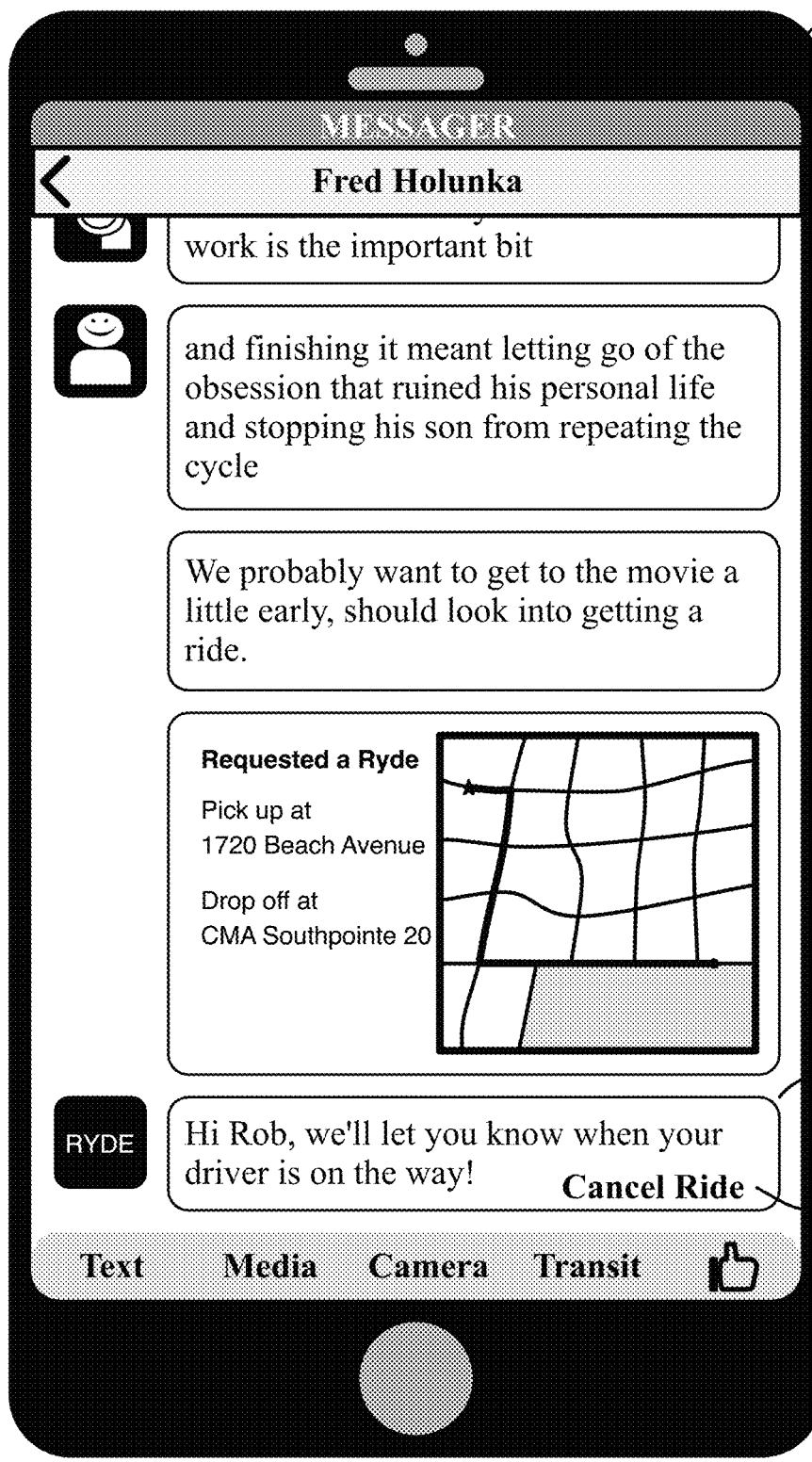
FIG. 4A illustrates an embodiment of a user interface displaying a bot message in a message thread.

FIG. 4A illustrates an embodiment of a user interface 400 displaying a bot message in a message thread. A bot message may be an automatically-generated message generated by an automated routine without direct human involvement.

In some cases, a bot may generate a message and provide the message to a message thread. The message may relate to a service requested of the bot from within the message thread. A request to the bot having been made from within the thread may authorize the bot to transmit a message to the message thread, which it may otherwise be prevented from doing. In this instance, the in-thread bot message 405 comprises a confirmation of the service requested of the bot. In some embodiments, an in-thread bot message 405 may include an in-message bot control 410—and may include a plurality of in-message bot controls. An in-message bot control 410 may empower a user to modify, cancel, or otherwise interact with the request to which the in-message bot message 405 relates. In this instance, the in-message bot control 410 empowers the cancelling of the requested transit service.

Figure 4B:
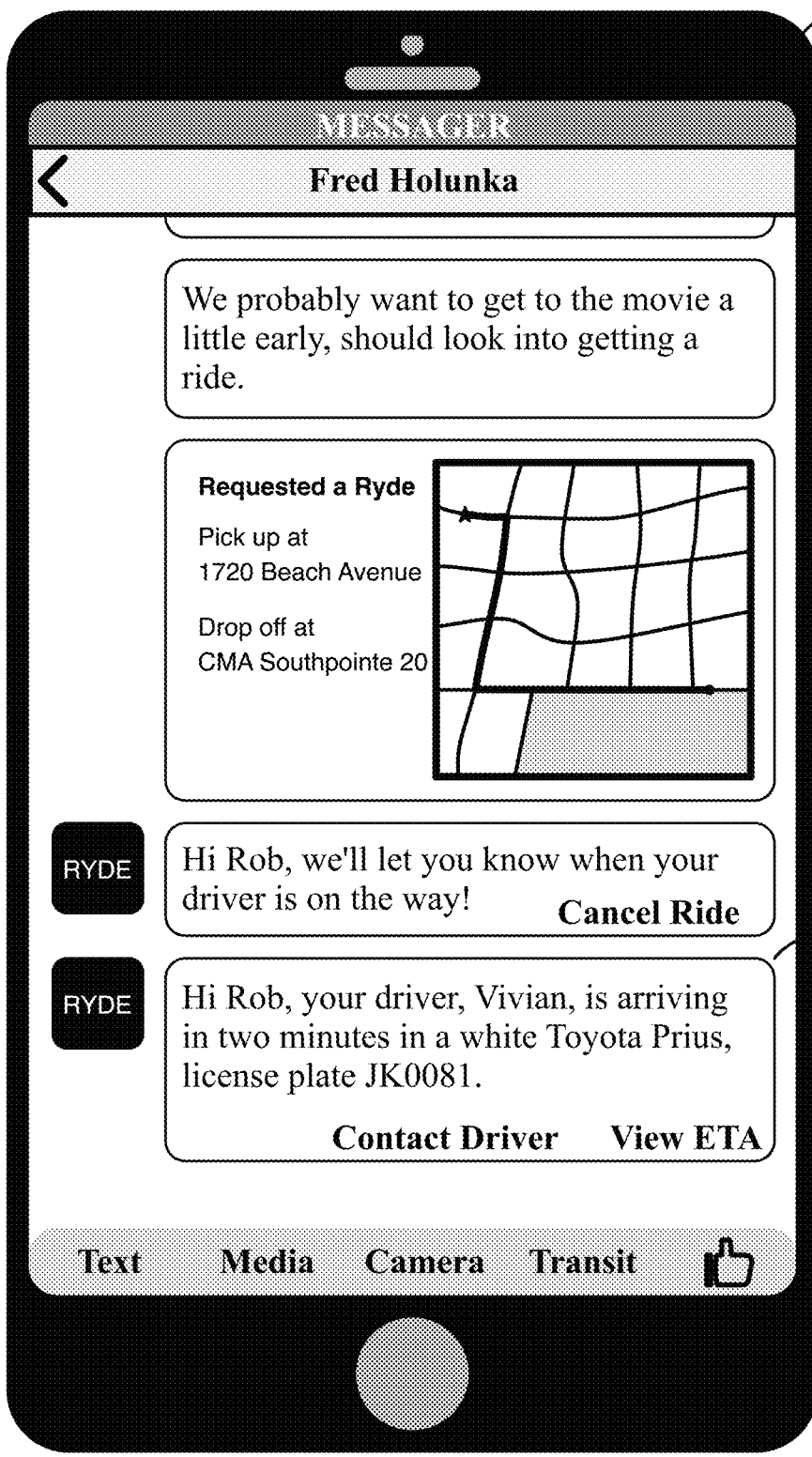
FIG. 4B illustrates an embodiment of a user interface displaying a bot message for a service update in a message thread.

FIG. 4B illustrates an embodiment of a user interface 425 displaying a bot message for a service update in a message thread.

In the illustrated embodiment, a second in-thread bot message 430 has been added to the message thread by the bot. The second in-thread bot message 430 relates to an update regarding the service requested of the bot, in this case an update communicating a specific individual providing the service requested of the bot, other information related to the performance of the service, and an estimated time related to the performance of the service. The second in-thread bot message 430 further comprises in-message bot controls 435 empowering additional functions, such as contacting the specific individual providing the service and retrieving an updated estimate time of arrival for the individual providing the service.2

Figure 4C:
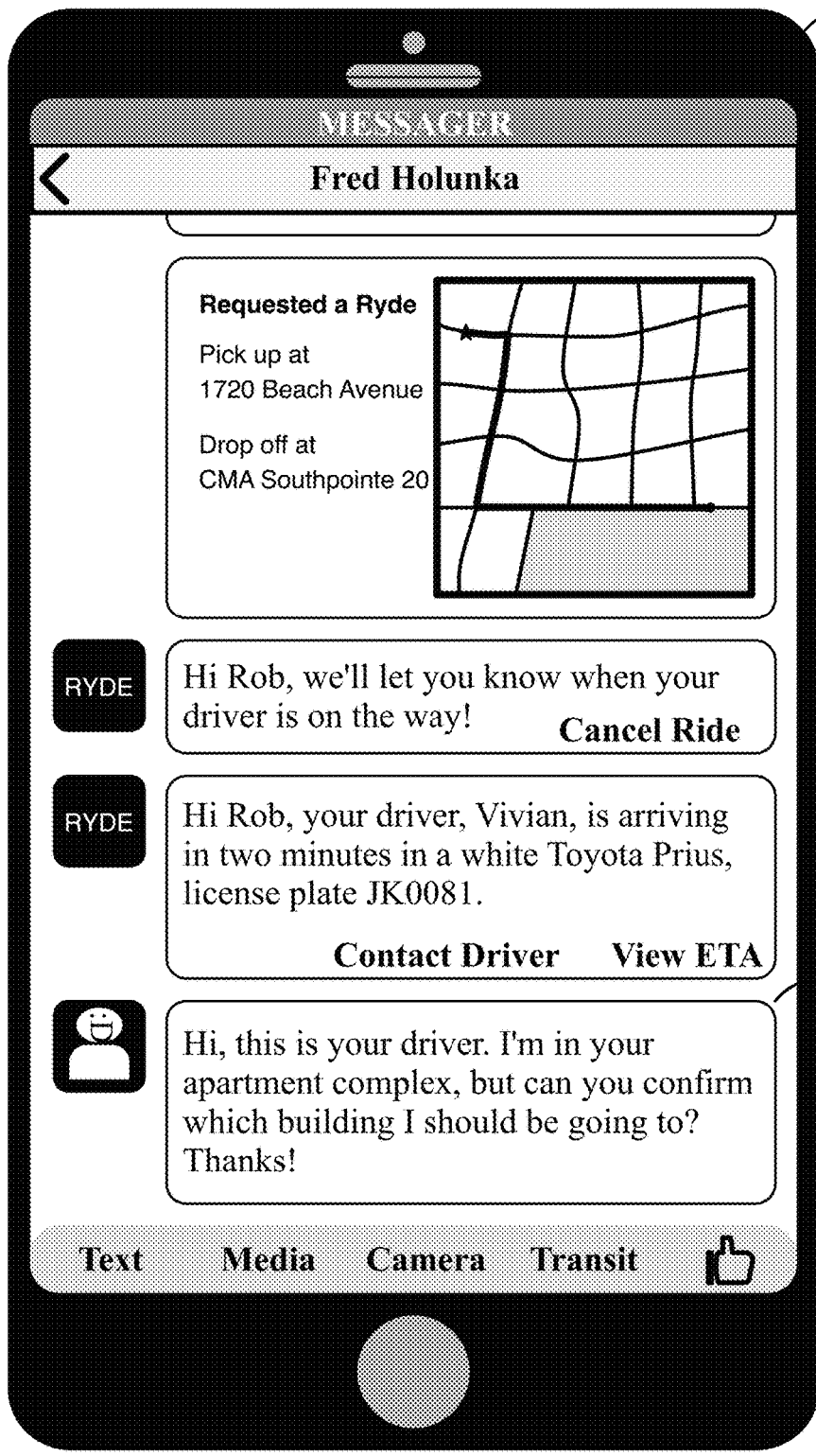
FIG. 4C illustrates an embodiment of a user interface displaying a live chat message from a service provider.

FIG. 4C illustrates an embodiment of a user interface 450 displaying an in-thread live chat message 455 from a service provider.

In some embodiments, in-thread messages for a service may be a bot message generated automatically by a messaging bot. However, in other embodiments, an in-thread message for a service may be an in-thread live chat message 455. An in-thread live chat message 455 may comprise a message composed and submitted by a human operator in response to a service requested in a message thread. In contrast to a bot message, an in-thread live chat message 455 may be individually generated or individually selected and submitted to the messaging system 100 in response to the situation of a service or other request made in a message thread, rather than programmed for use or programmatically generated.

The in-thread live chat message 455 may be inserted into the message thread despite the service not generally being a participant in the message thread, not generally being privy to the contents of the message thread, and not generally being authorized to add messages to the message thread. A service may be authorized by the messaging system 100 to submit an in-thread live chat message 455 to a message thread based on the message thread having been used to make a request of, query to, or otherwise contacting the service. However, the service provider may be prevented from receiving and viewing any messages not directed to the service provider and may only be provided any messages specifically directed to the service provider, such as messages that use a service alias or messaging bot alias at the start or that are otherwise addressed to the service provider or are responding to a message from the service provider.

An in-thread live chat message 455 may be provided by the operator providing a specific service. In the illustrated embodiment, a driver for a ride-sharing service has transmitted the in-thread live chat message 455 to the messaging system 100 and had the in-thread live chat message 455 distributed to participants in the message thread. In these cases, an in-thread live chat message 455 may be associated for display with an account name, user avatar, or other personal identifying information for the operator providing a specific service and the operator may be individually authorized to temporarily access the message thread or a portion thereof. For instance, the operator may be individually authorized to temporarily access the portion of the message thread addressed to the operator or to the service with which the operator is associated. An operator or service may be addressed by prefixing the comment with an address symbol, such as the "@" symbol, and a name for the service.

Alternatively, an in-thread live chat message 455 may be provided by the service provider for the service, such as a representative of the service provider. For instance, a customer-service representative of a ride-sharing service may transmit an in-thread live chat message 455 to the messaging system 100 for distribution to participants in the message thread. In these cases, an in-thread live chat message 455 may be associated for display with an account name, user avatar, or other personal identifying information for the representative of the service and the representative may be individually authorized to temporarily access the message thread. Alternatively, an in-thread live chat message 455 may be associated for display with an account name, user avatar, or other identifying information for the service at large. A computer system for the service may be authorized to temporarily access the message thread or a portion thereof, with the service providing access to the computer system for communication with the message thread to its representatives according to its own procedures. For instance, the operator may be individually authorized to temporarily access the portion of the message thread addressed to the operator or to the service with which the operator is associated.

Figure 5A:
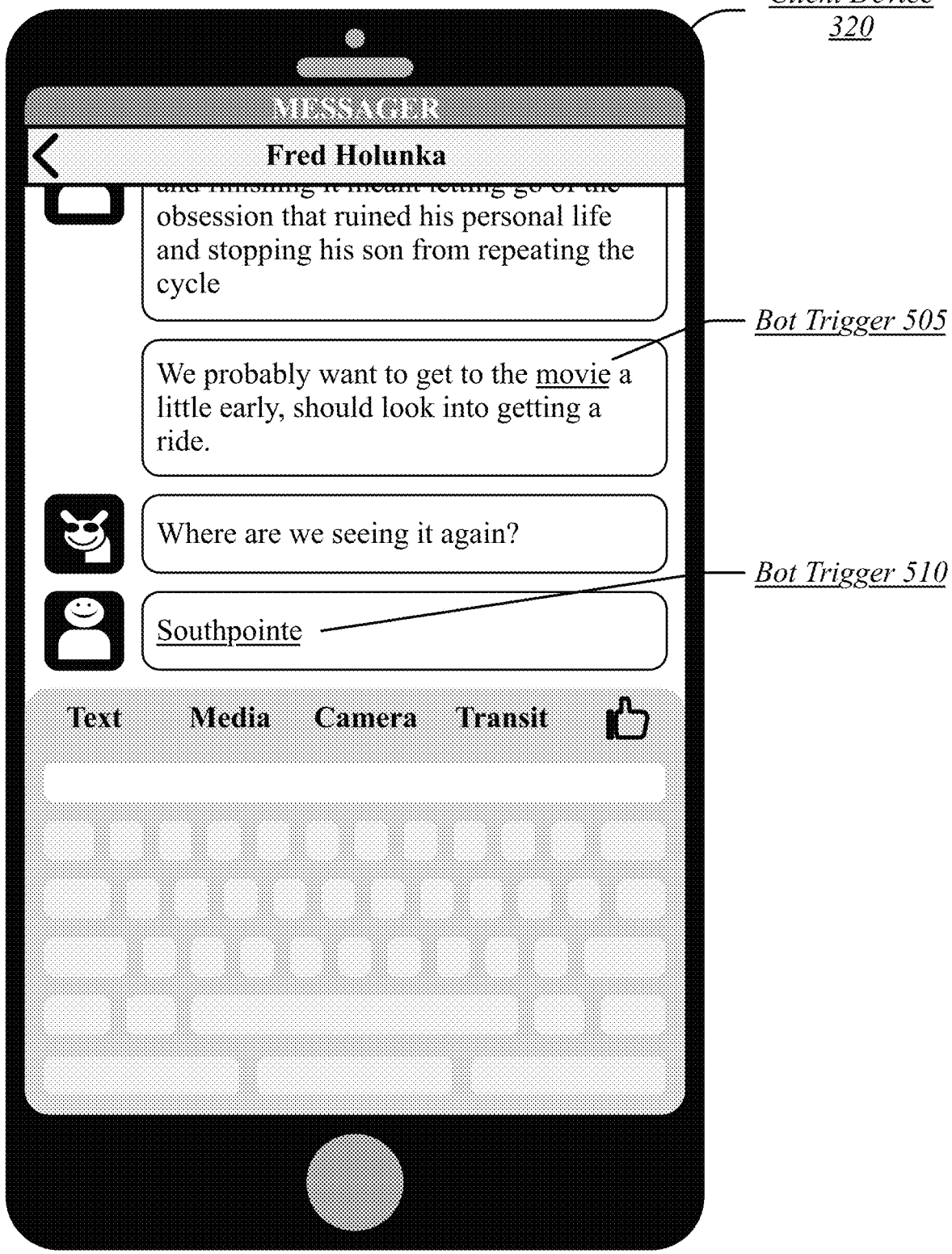
FIG. 5A illustrates an embodiment of a user interface displaying a trigger in a message thread.

FIG. 5A illustrates an embodiment of a user interface 500 displaying a trigger in a message thread.

A trigger may generally correspond to a word, phrase, or other element of a message thread that a messaging system 100 associates with a potential action. A bot trigger may generally correspond to a trigger that the messaging system 100 associated with a potential request to a bot. In the illustrated embodiment, the text segment "movie" may comprise a first bot trigger 505 and the text segment "Southpointe" a second bot trigger 510. The first bot trigger 505 may indicate an interest in bot requests related to movies. The second bot trigger 510 may indicate an interest in bot requests related to the location "Southpointe," which either independently or in association with the existing thread context of movies may be identified as being associated with a particular movie theater called "Southpointe." A user selecting a trigger may invoke suggested services, such as suggested bots, related to the trigger. Triggers may be determined based on predetermined and pre-assigned associations between words and/or phrases and services, or may be automatically determined based on natural language programming techniques.

Figure 5B:
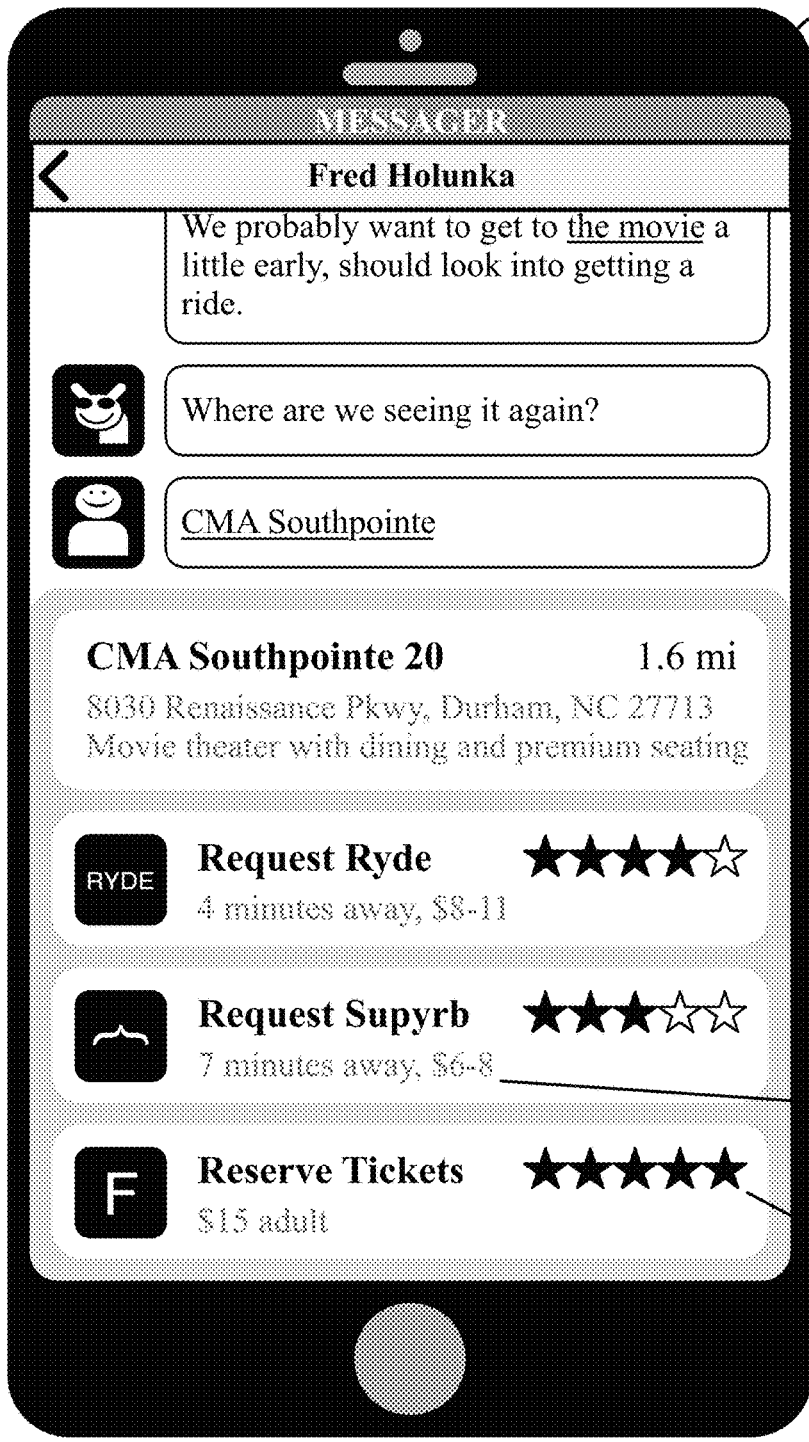
FIG. 5B illustrates an embodiment of a user interface displaying suggested services in response to a trigger.

FIG. 5B illustrates an embodiment of a user interface 525 displaying suggested services in response to a trigger.

A user may select a trigger in a messaging thread interface. In response the messaging client may retrieve and display a plurality of suggested services, such as may correspond to suggests bots, in a plurality of triggered controls 530. In some embodiments, the plurality of suggested services may be automatically displayed on response to the messaging client and/or messaging system 100 detecting a trigger. The triggered controls 530 may comprise a plurality of messaging bot options. A messaging bot option 535 may comprise a particular bot associated with a particular service. In some embodiments, a messaging bot option may be associated with service performance information 540. Service performance information may include, for instance, estimated performance information such as an estimated time of arrival and estimated cost or price information. A messaging bot option may include service rating information 545, the service rating information 545 comprising an evaluation of the quality of a service, such as may be derived from user feedback. A messaging bot option may be selected to invoke an interaction with an associated messaging bot. The messaging bot options may be displayed in association with the messaging thread from which they are invoked.

The triggered controls 530 may comprise suggestions for services and for messaging bots. The triggered controls 530 may comprise a ranked list of suggested messaging bots. Suggested messaging bots may be determined based on a variety of techniques and based on a variety of factors. Suggested messaging bots may be selected and ranked based on the location of the user(s) in the thread. For instance, messaging bots that are geographically proximate or more geographically proximate to a location of one or more users may be selected or ranked higher. Messaging bots that relate to activities that have previously been associated with a user's current geographic location may similarly be selected or ranked higher, such as suggesting restaurant-related messaging bots when a couple are messaging each other while both are at their place of employment.

Suggested messaging bots may be selected and ranked based on associations between one or more detected keywords or intents and the messaging bots. A keyword may correspond to a word or phrase extracted from the contents of a messaging interaction. The messaging system 100 may have a registry of relevant keywords and may examine the contents of messaging interactions to identify and extract those keywords as a basis for selecting and ranking messaging bots. For example, a mention of "ride" or "transport" may prompt the suggestion of transportation-related service or a higher ranking for transportation-related services. An intent may comprise a keyword, concept, phrase, or other identifier generated based on the context of a messaging interaction that is not explicitly used within the messaging interaction. The messaging system 100 may have a registry of intents and may perform natural language processing on the contents of a messaging interaction to determine intents inferred by the messaging interaction. For example, a mention of multiple specific movies may imply the intent keyword "movie" without a specific use of the word "movie." In another example, a person-to-person inquiry regarding whether they "want to go see something" could imply an interest in movies without the direct use of the word "movie."

Keywords and/or intent may be extracted from the content, or a portion of the content, of the messaging interaction embodied in a message thread. In some cases, a recent portion of the message thread may be used, such as by detecting a current period of engagement with the message thread and extracting keywords and/or intent from the message thread for that current period. The recent portion of a message thread may be defined according to a variety of techniques. In some cases, the recent portion may be defined according to a predefined length of time, with the recent portion being the segment of the thread exchanged during an extent of time spanning a length equal to the predefined length of time and concluding at the current time. In some cases, the recent portion may be determined as spanning a variable length, such as by detecting the most recent break in conversation of sufficient length, which may be predefined, to indicate temporary disengagement with the message thread. For example, the recent portion of the message thread may be the maximum extent of the thread concluding at the current time that does not include any gap in conversation longer than one hour. Other techniques for defining a recent portion of a thread may be used. This recent portion of the message thread may be analyzed to determine one or more keywords, which may comprise one or more explicit keywords explicitly used within the message thread and which may comprise one or more intent keywords inferred from the message thread based on natural language processing techniques.

Keywords, whether explicitly extracted or derived from intent, may be used to determine one or more services that may be of interest to the user(s) in the message thread. The triggered controls 530 may comprise a selection of messaging bots corresponding to one or more providers for the one or more services. For instance, keywords related to "movies" and "transportation" may be extracted or inferred. A plurality of providers related to movies may be selected, such as a ticket-vendor service and a movie-theater operator. A plurality of providers related to transportation may be selected, such as a plurality of ride sharing services. The plurality of providers for each of the plurality of services may be joined together into a plurality of combined providers representing the plurality of services detected as being of possible internet to the user(s) in the message thread. This plurality of combined providers, and their associated messaging bots, may then be ranked according to a variety of factors, including location, level of detected interest in the services provided by the providers, level of detected interest in the specific providers, previous history of requesting various services either globally for the one or more user(s) or specifically within the message thread, previous history of using various providers either globally for the one or more user(s) or specifically within the message thread, or according to any other relevant factor.

In some embodiments, where multiple services are to be offered, the ranking of the corresponding providers may be constructed so as to showcase the variety of services being offered. For instance, a highest-ranked provider for each service may be selected and offered as the top-listed provider (and therefore a top-listed associated messaging bot) prior to a second provider for any of the services. The highest-ranked provider for each service may be ranked according to predicted interest in the service in general and/or based on the predicted interest in the provider specifically, such as may be determined according to various factors described herein.

Figure 6:
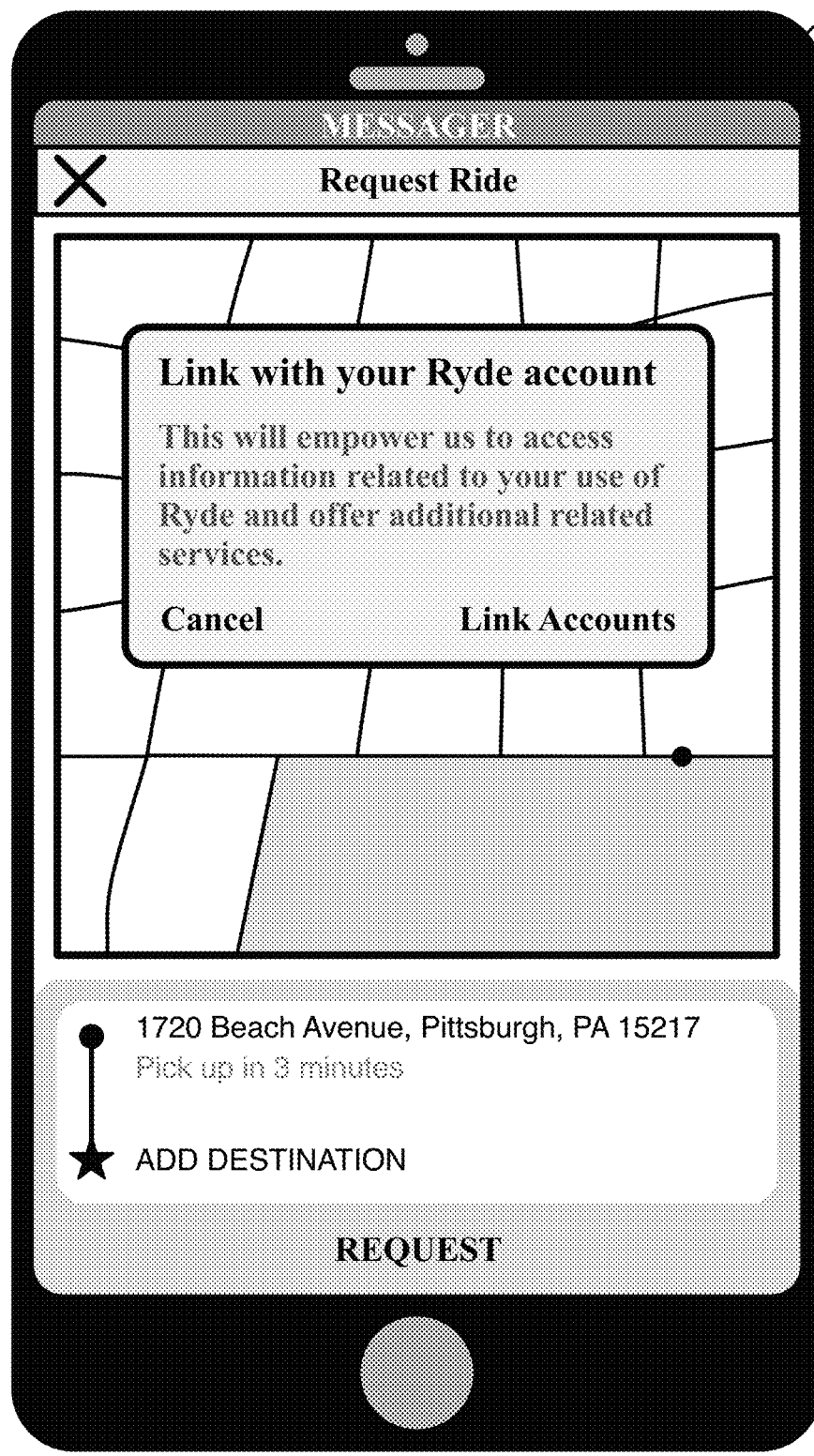
FIG. 6 illustrates an embodiment of a user interface displaying a prompt to link accounts.

FIG. 6 illustrates an embodiment of a user interface 600 displaying a prompt to link accounts.

Where a user already possesses an account with a particular service, and in particular where a messaging client is aware that the user has the account with the particular service, the user may be invited to link their messaging account with the messaging system 100 with the user account for the service. The messaging client may detect that the user already has an account with the service based on, for example, an application for the service being installed on the client device 320, identifying information for the user (e.g., a phone number, an email address) being known to both the messaging client and the service, or using any known technique.

A user that already possesses an account with a service corresponding to a selected bot may be presented with an existing user dialog 605. An existing user dialog 605 may comprise a control to cancel, or refrain, from linking accounts. An existing user dialog 605 may comprise a control to continue with linking accounts.

Linking accounts may include an exchange of information between the messaging system 100 and a system for the service. Linking accounts may include an exchange of identifying information for the user, such as name, demographic information, address, phone number, e-mail address, or other information. Linking accounts may include an exchange of financial information. In general, any information related to the user may be exchanged as a result of linking accounts. Linking accounts may empower the messaging system 100 to request services with the linked service on behalf of the user. Linking accounts may empower the linked service to transmit messages to the user via the messaging system 100.

Figure 7A:
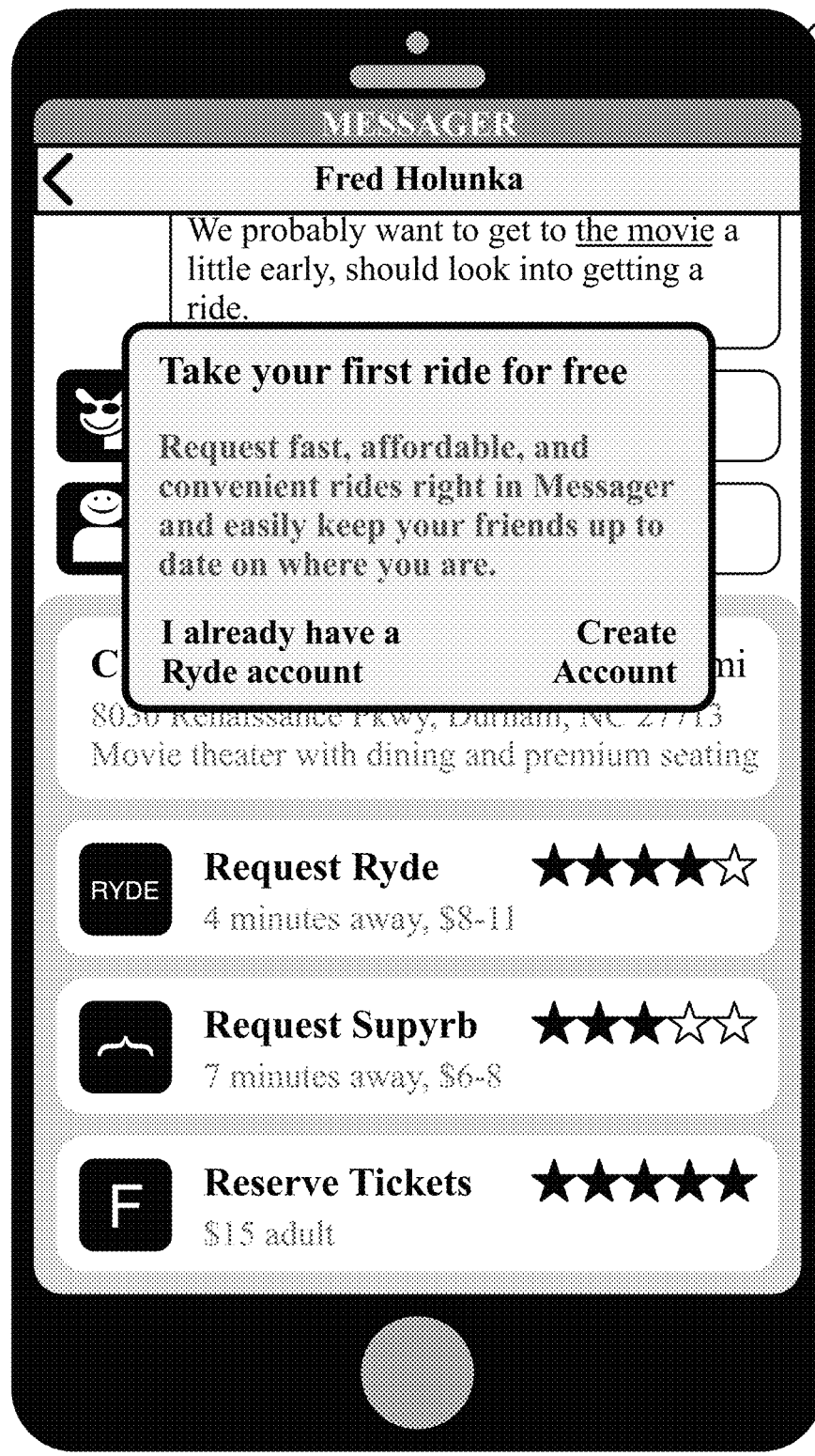
FIG. 7A illustrates an embodiment of a user interface displaying a new user dialog.

FIG. 7A illustrates an embodiment of a user interface 700 displaying a new user dialog 705.

A new user dialog 705 may be displayed by the messaging client when the messaging client lacks knowledge that the user has an existing account with the service. The new user dialog 705 may be invoked when a bot is selected where the messaging client lacks knowledge that the user has an existing account with the service. The new user dialog 705 may include a existing-account control empowering the user to indicate that they already have an account with the service and to provide information for the service account to link the accounts. The new user dialog 705 may include an account creation control empowering the user to configure an account with the service.

Figure 7B:
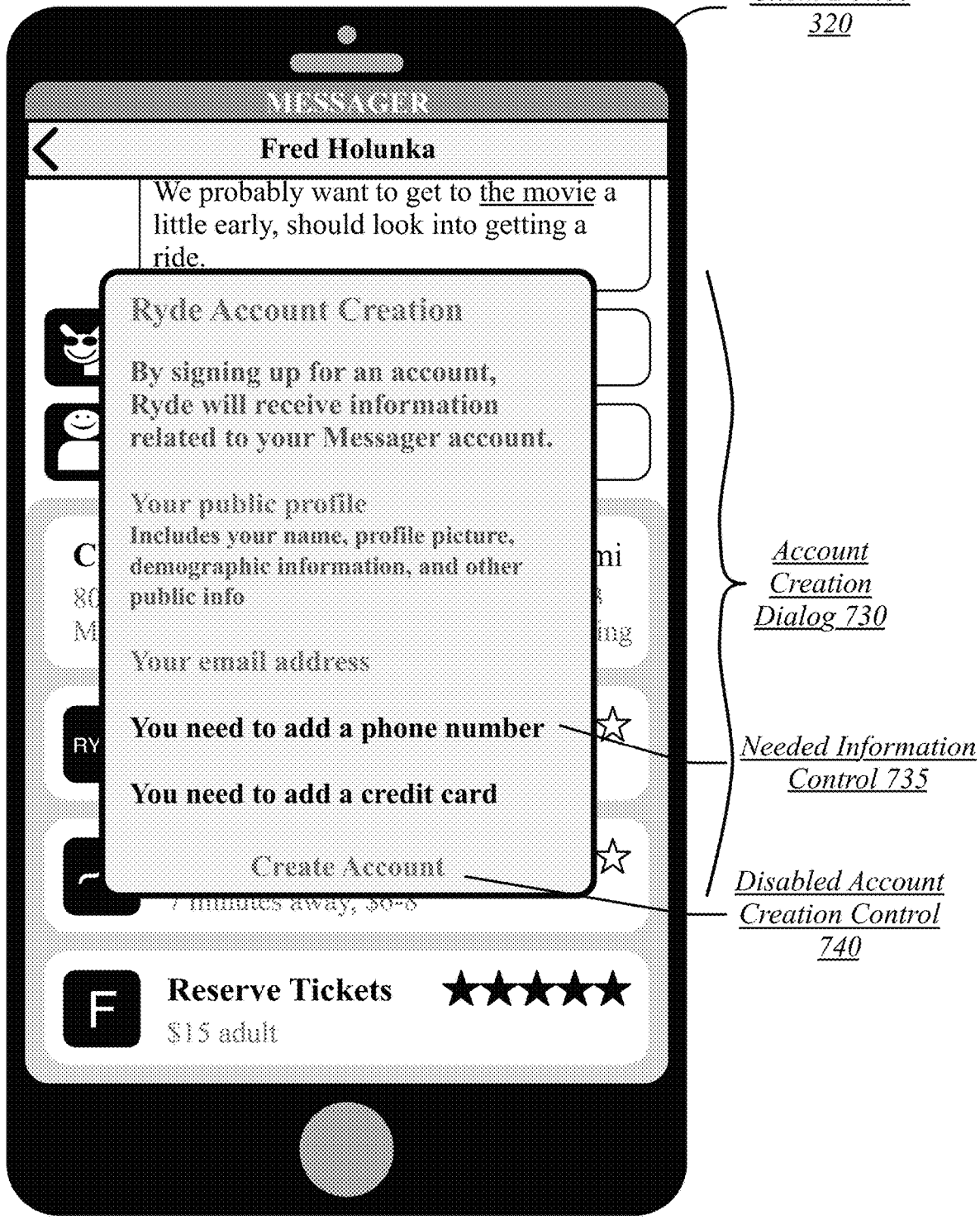
FIG. 7B illustrates an embodiment of a user interface displaying an account detail request for an account creation dialog.

FIG. 7B illustrates an embodiment of a user interface 725 displaying an account detail request for an account creation dialog 730.

The account creation dialog 730 may empower a user to create an account with the service for a selected bot. At least some portion of the required details for an account may be specified by the messaging system 100 where known to the messaging system 100. In the illustrated embodiment, the email address and the public profile (i.e., for a social-networking system) may be shared to empower details required by the service.

However, some details may be unknown to the messaging system 100 and the account creation dialog 730 may therefore request that the user specify the unknown details. A needed information control 735 empowers a user to specify required information unknown to the messaging system 100. In the illustrated embodiment, the messaging system 100 requests the phone number and credit card information for the user, for providing to the service. The messaging system 100 may retain this information to expand the user account information for the user, and may thereafter reuse this information.

Where information required by a service is still unknown to the messaging system 100, the messaging client may present a disabled account creation control 740. A disabled account creation control 740 may be inactive, such that a user may not use it to complete account creation. The disable account creation control 740 may be enabled once the required information is entered.

Figure 7C:
FIG. 7C illustrates an embodiment of a user interface displaying a completed account creation dialog.

FIG. 7C illustrates an embodiment of a user interface 750 displaying a completed account creation dialog.

The completed account creation dialog may correspond to a dialog shown once all of the required information for a user is registered with the messaging system 100. Where a bot is selected that requires information all of which is known to the messaging system 100, the complete account creation dialog may be immediately displayed without an intermediary incomplete account creation dialog. Now that all the information required by the service is registered with the messaging system 100, the account creation dialog 730 now includes an enabled account creation control 755. The enabled account creation control 755 may empower the user to initiate the creation of the account with the service. The messaging system 100 my provide the required information to the service and thereby perform the account creation.

In some embodiments, financial information may only be provided to the service in a tokenized form. A tokenized form of financial information, such as credit card information, may be sufficient to empower the service to perform a transaction without the service having access to the details of the financial information. For instance, a credit card number for the user may be hidden from the service and only maintained with the messaging system 100. In some embodiments, the messaging system 100 may perform financial transactions on behalf of the user using the financial information for the user and then provide the required funds to the service. In either embodiments, the user's financial information may be protected by refraining from transmitting it to the service.

Figure 8A:
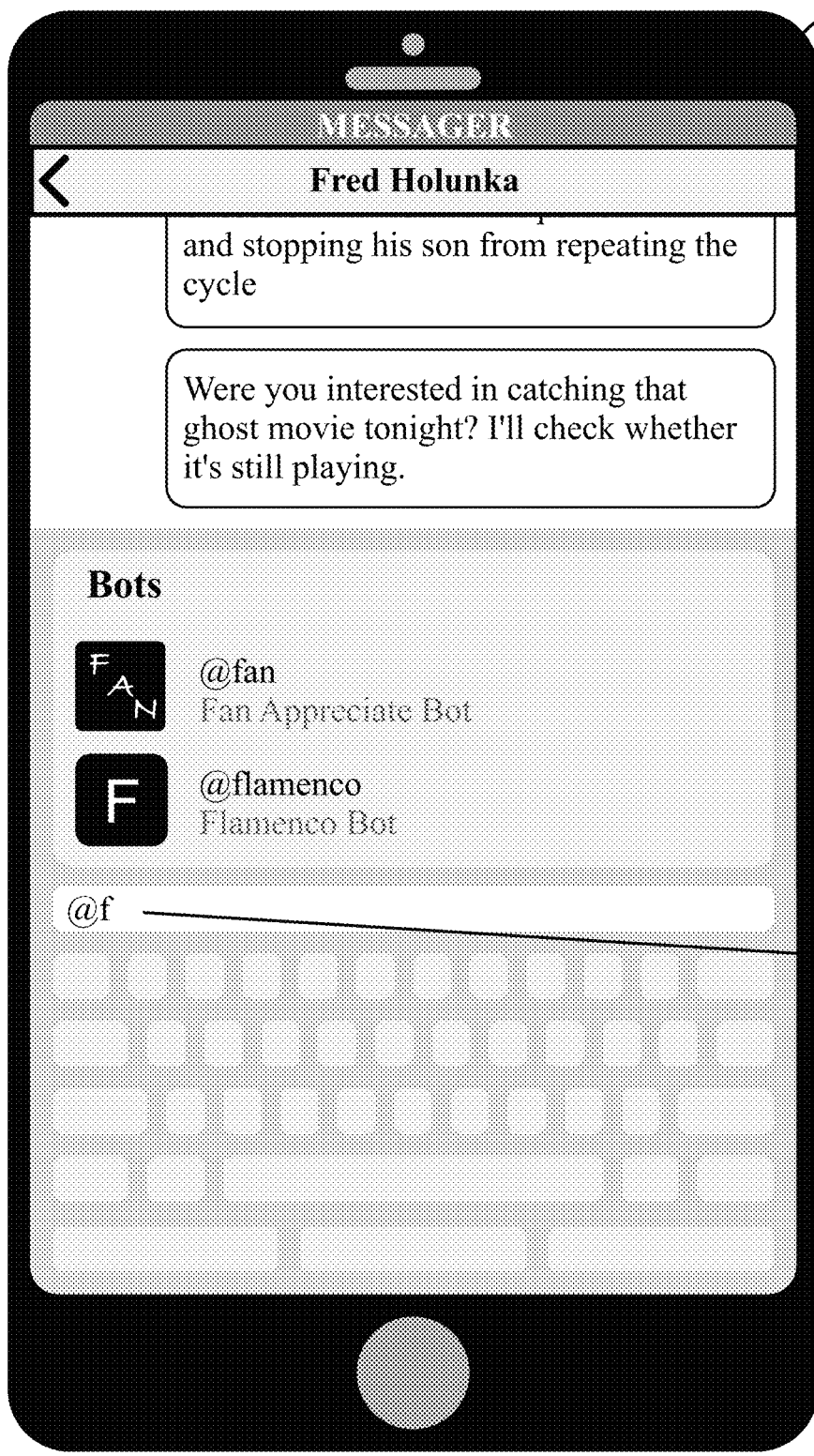
FIG. 8A illustrates an embodiment of a user interface displaying a partial bot address with suggested bots.

FIG. 8A illustrates an embodiment of a user interface 800 displaying a partial bot address 810 with suggested bots 805.

A user may enter text in a text entry field of a messaging interface using text controls. The text entered by the user may be analyzed to determine whether it may correspond to a bot invocation. In some embodiments, a particular symbol, such as the '@' symbol, may be used to indicate bot invocation. The messaging client and/or messaging system 100 may detect the bot invocation symbol and suggest bots in return. Where additional text beyond the bot invocation symbol has been specified, the messaging system 100 may generate particular suggested bots 805 with bot aliases beginning with the specified text. A bot alias may correspond to a registered name for a bot, the name registered with the messaging system 100.

The suggested bots 805 may be determined based on a variety of techniques. In some embodiments, suggested bots 805 may be determined based on the contents of the message thread in which the partial bot address 810 is entered. For instance, bots related to the context of the message thread may be suggested. In the illustrated embodiment, a bot for a movie service may have been suggested in response to the message thread referencing going to a movie. In some embodiments, bots may be suggested based on the history of one or more users involved in the message thread, and in particular the user of the client device 320. For instance, bots recently used, frequently used, recently or frequently used on previous occasions similar to the current occasion (e.g., time of day, day of the week), or otherwise related to a user's history may be suggested. Any of various techniques may be used for the selection of the suggested bots 805, such as any of the techniques described with reference to FIG. 5B. Selecting a suggested bot may automatically complete the text entry field with the complete alias for the selected bot.

Figure 8B:
FIG. 8B illustrates an embodiment of a user interface displaying suggested commands retrieved based on a complete bot address.

FIG. 8B illustrates an embodiment of a user interface 825 displaying suggested commands 830 retrieved based on a complete bot address 835.

A complete bot address 835 may comprise a text segment beginning with the bot invocation symbol and followed by a text segment corresponding to a bot alias. The completion of a bot address may be determined through the use of a particular character not allowed within a bot alias, such as a space. In response to a complete bot address 835 being entered in the text entry field, suggested commands 830 may be retrieved by the messaging client and provided to the user.

Suggested bot commands 830 may be determined by the service corresponding to the bot. Suggested bot commands 830 may comprise commands available for issuing to the bot. The suggested bot commands 830 may be determined based on a variety of techniques. In some embodiments, suggested bot commands 830 may be determined based on the contents of the message thread in which the complete bot address 835 is entered. For instance, bot commands related to the context of the message thread may be suggested. In the illustrated embodiment, a bot for a movie service may have been suggested in response to the message thread referencing going to a movie. However, in other embodiments the bot service may be prevented from receiving any message content not specifically marked for the bot so as to avoid violating the privacy of the message thread. In some embodiments, keywords may be provided to the bot service without providing the full history of the message thread.

In some embodiments, bot commands may be suggested based on the history of one or more users involved in the message thread, and in particular the user of the client device 320. For instance, bot commands recently used, frequently used, recently or frequently used on previous occasions similar to the current occasion (e.g., time of day, day of the week), or otherwise related to a user's history may be suggested. In some embodiments, a user identifier for the user that entered the complete bot address 835 may be provided to the bot service to empower the bot service to act based on the user history known to it. In some embodiments, the bot service may be responsible for generating and providing suggested bot commands 830 to the messaging system 100 for providing to the user via the messaging client. Selecting a suggested bot command may automatically complete the text entry field with the complete bot command.

Figure 8C:
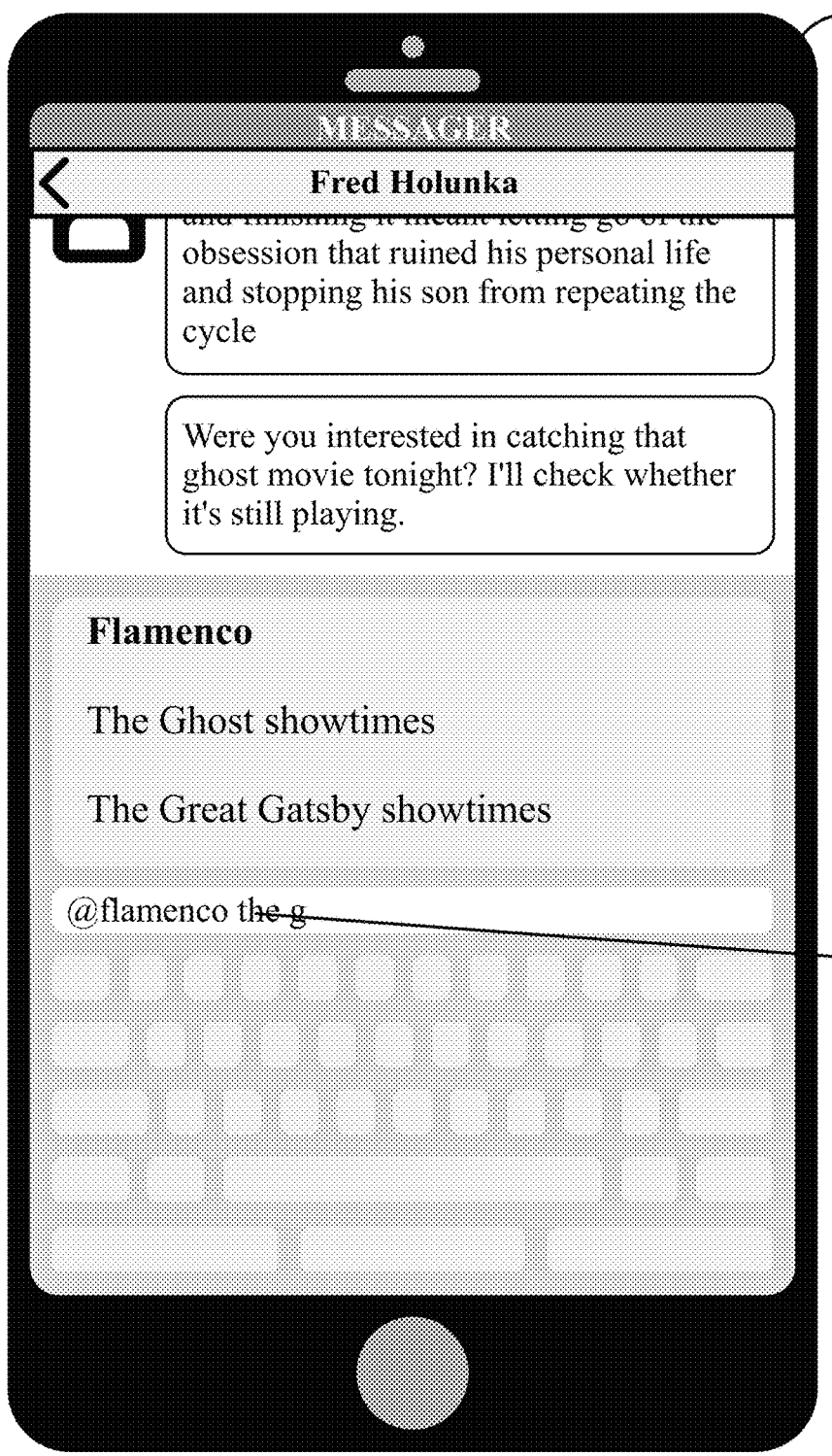
FIG. 8C illustrates an embodiment of a user interface displaying updated suggested commands retrieved based on a partial bot command.

FIG. 8C illustrates an embodiment of a user interface 850 displaying updated suggested commands 855 retrieved based on a partial bot command 860.

A text entry field may contain a bot invocation symbol followed by a complete bot alias and a partial bot command 860. The messaging system 100 may match the partial bot command 860 against bot commands for the bot service specified by the complete bot alias to provide updated suggested commands 855 corresponding to the partial bot command 860, such as commands beginning with the characters of the partial bot command 860. In some embodiments, the partial bot command 860 may provided to a bot service associated with the complete bot alias, with the updated suggested commands 855 provided in response and thereafter provided to the user via the messaging client. In these embodiments, the messaging system 100 may provide each text segment generated on the messaging client (i.e., each text segment generated through the iterative addition of characters) to the appropriate bot service and receive suggested commands in response and provide the suggested commands to the user.

Figure 8D:
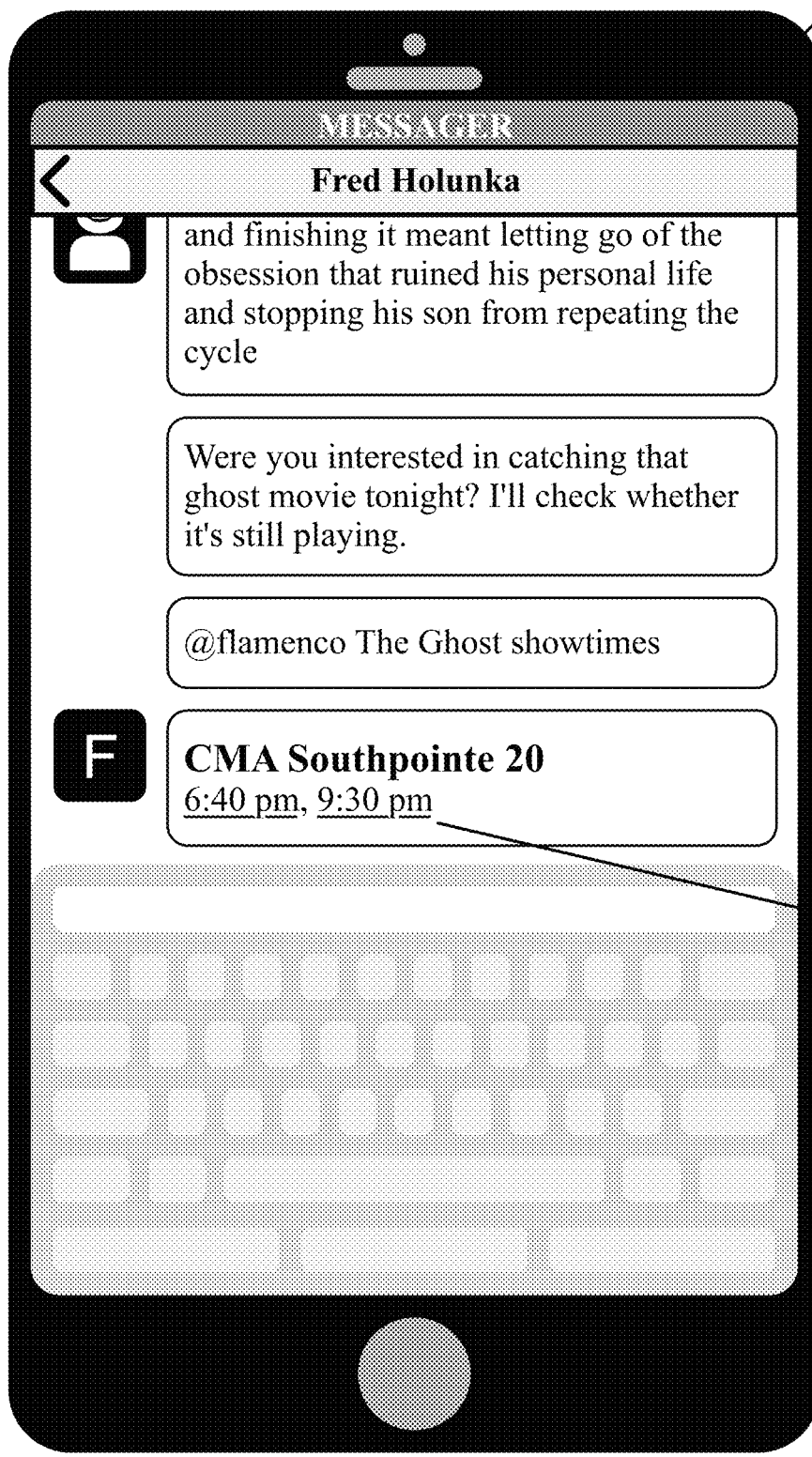
FIG. 8D illustrates an embodiment of a user interface displaying an in-thread bot response.

FIG. 8D illustrates an embodiment of a user interface 875 displaying an in-thread bot response 885.

An in-thread bot command 880 entered via the text entry field for a message thread may be distributed as a message within the message thread to all participants in the message thread, and thereby to all devices used by all participants in the message thread. The in-thread bot command 880 may further be provided to the bot service.

The bot service may reply to the in-thread bot command 880 with an in-thread bot response 885. The in-thread bot response 885 may be inserted into the message thread despite the bot service not generally being a participant in the message thread, not generally being privy to the contents of the message thread, and not generally being authorized to add messages to the message thread. The in-thread bot response 885 may comprise a response generated by the bot service in response to the in-thread bot command 880. In this instance, the in-thread bot response 885 comprises in-thread bot controls 890 empowering the user to take action related to the in-thread bot response 885. The user may also be empowered to responds to the in-thread bot response 885 using additional bot commands entered via the text entry field and transmitted out as elements of the message thread.

Figure 9:
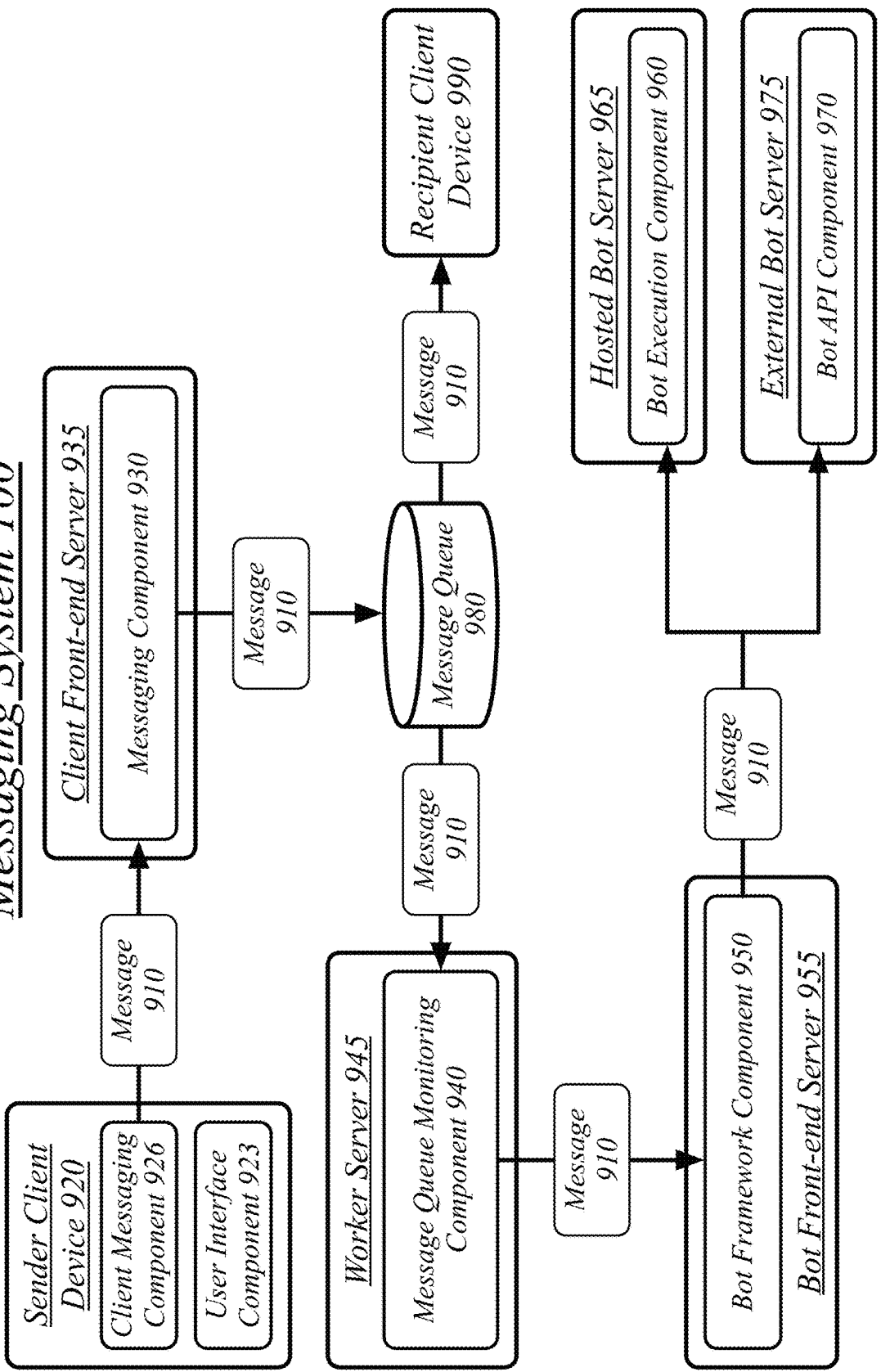
FIG. 9 illustrates an embodiment of a message being transmitted through a messaging system.

FIG. 9 illustrates an embodiment of a message 910 being transmitted through a messaging system 100.

A messaging system 100 may comprise a plurality of components. In some embodiments, these plurality of components may be distributed among a plurality of servers. In other embodiments, a single server may implement the plurality of components. In some embodiments, a plurality of servers may be executed by a single server device. In other embodiments, the plurality of servers may be executed by a plurality of server devices. In some embodiments, multiple instances of the various components and various servers may be executed to provide redundancy, improved scaling, and other benefits. Similarly, a client device may execute a plurality of components as part of a messaging client.

A client device may communicate with other devices using wireless transmissions to exchange network traffic. Exchanging network traffic, such as may be included in the exchange of messaging transactions, may comprise transmitting and receiving network traffic via a network interface controller (NIC). A NIC comprises a hardware component connecting a computer device, such as client device, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein, including the interoperation of the messaging client and messaging servers 110 through network communication. For example, the messaging client transmitting or receiving messages to or from a client front-end server 935 may be interpreted as using the network interface controller for network access to a communications network for the transmission or reception of information.

A messaging client may comprise a user interface component 923. A user interface component 923 may be generally arranged to display user interfaces to a user of a client device and to receive user commands for the messaging client for the client device. The user interface component 923 may receive a messaging bot invocation in a message thread display on the client device and invoke a messaging bot interaction user interface on the client device in combination with the message thread display in response to the messaging bot invocation. The user interface component 923 may then receive a messaging bot interaction command via the messaging bot interaction user interface.

A messaging client may comprise a client messaging component 926. A client messaging component 926 may be generally arranged to conduct messaging interactions on the behalf of the messaging client via communication with the client front-end server 935. The client messaging component 926 may be operative to transmit the messaging bot interaction command from the client device to a messaging system. The messaging bot interaction command may be at least a portion of a message 910, such as at least a portion of a text segment communicated as the message 910. In some cases, the text segment comprising a message body of the message 910 may correspond to the messaging bot interaction command.

A client front-end server 935 may be generally arranged to act as a network access point to the messaging system 100 for client devices such as sender client device 920. The client front-end server 935 may comprise a messaging component 930, the messaging component 930 generally arranged to act as a network access point to messaging services for the messaging system 100. The messaging component 930 may receive the message 910 from a sender client device 920 and add the message 910 to a message queue 980.

The message queue 980 may be specifically associated with the user of sender client device 920, such as by being uniquely associated within the messaging system 100 with a user account for the user of sender client device 920. The message queue 980 may be a single queue used for all messaging endpoints used by this user. The message queue 980 may comprise a representation of updates in a strict linear order. The message queue 980 may be organized as a data unit according to a variety of techniques. The message queue 980 may be stored in semi-persistent memory, persistent storage, both semi-persistent memory and persistent storage, or a combination of the two. The message queue 980 may be organized according to a variety of data structures, including linked lists, arrays, and other techniques for organizing queues. The message queue 980 may generally comprise a first-in-first-out (FIFO) queue in which no update will be removed from the queue before any updates that were received prior to it.

The messaging system 100 may comprise a worker server 945. In general, the messaging system 100 may comprise a plurality of worker servers that may be assigned to various tasks. A worker server 945 may comprise a message queue monitoring component 940, the message queue monitoring component 940 arranged to monitor updates, such as may comprise messages, in the message queue 980 and other message queues of the messaging system 100 for various flags, indicators, and other information.

The message queue monitoring component 940 may be operative to monitor the message queue 980. The message queue monitoring component 940 may examine each entry within the message queue 980 and detect that the message 910 indicates messaging bot invocation. In response to detecting that the message 910 indicates messaging bot invocation, the message queue monitoring component 940 may submit the message 910 to a bot framework component 950. Submitting a message 910 to the bot framework component 950 may, in some embodiments, comprise transmitting the message 910 to the bot framework component 950. In other embodiments, submitting a message 910 to the bot framework component 950 may comprise transmitting a notification to the bot framework component 950 that a message 910 with a messaging bot invocation was detected, such as by transmitting an identifier for the message 910 to the bot framework component 950.

The messaging system 100 may comprise a bot front-end server 955. A bot front-end server 955 may act as an access point to messaging bot services for the messaging system 100. The bot front-end server 955 may act as an intermediary between the servers of the messaging system 100 and one or more internal and/or external bot execution servers. The bot front-end server 955 may comprise a bot framework component 950 generally arranged to provide an accessible framework to the messaging bot system.

The bot framework component 950 may be operative to receive the message 910 from the message queue monitoring component 940, or receive notification of the message 910 from the message queue monitoring component 940 and retrieve the message 910 from the message queue 980, determine a messaging bot associated with the message 910, and submit the message to the messaging bot.

The messaging bot invocation may comprise a bot invocation text segment. The message 910 may comprise a text content portion, the text content portion recording the bot invocation text segment. The user interface component 923 may receive a bot invocation text segment in a text entry portion of the message thread display. The client messaging component 926 may transmit the bot invocation text segment to the messaging servers 110.

A bot invocation text segment may be identified based on the text segment beginning with a bot invocation symbol, such as the "@" address symbol. The message queue monitoring component 940 may detect a bot invocation symbol in the text content portion of a message 910 and detect that the message 910 indicates messaging bot invocation based on detecting the bot invocation symbol. The message queue monitoring component 940 may be operative to examine each message in a message queue 980 for those messages that start with the bot invocation symbol.

In some embodiments, a sender client device 920 may flag messages that include information for a bot by flagging a metadata portion of a message 910 with a bot invocation flag. The message queue monitoring component 940 may detect a bot invocation flag in the metadata portion of the message 910 and detect that the message 910 indicates messaging bot invocation based on detecting the bot invocation flag.

In some cases, messaging bots may be executed by servers external to the messaging system 100, such as an external bot server 975 operated by the service associated with the bot. The bot framework component 950 may determine an external bot server 975 for the service associated with the messaging bot. The messaging system 100 may maintain a bot alias registry indexed based on bot aliases. The bot framework component 950 may look up the messaging bot identified by a bot alias from the message 910 and retrieve bot information for the external bot server 975 associated with the bot alias. The bot information may indicate, without limitation, addressing information for contacting the external bot server 975. The bot framework component 950 may submit the message 910 to the messaging bot by transmitting the message 910 to the external bot server 975 associated with the messaging bot. In some embodiments, submitting the message 910 may comprise extracting message content and transmitting the message content to the external bot server 975 using a bot server interaction application programming interface (API).

In other cases, messaging bots may be executed by the servers of the messaging system 100. The bot framework component 950 may determine a hosted bot server 965 for the service associated with the messaging bot. The bot framework component 950 may look up the messaging bot identified by a bot alias from the message 910 and retrieve bot information for the hosted bot server 965 associated with the bot alias. A hosted bot server 965 may comprise a bot server maintained by the provider of the messaging system 100. The bot framework component 950 may submit the message 910 to the messaging bot by transmitting the message 910 to the hosted bot server 965 associated with the messaging bot.

The messaging system 100 may assist users in finding bots and in addressing bots. The messaging system 100 may generate suggested messaging bots for the user of a client device. These suggestions may be generated in response to the predicted invocation of a messaging bot, such as by entering a bot invocation symbol in a text entry field of a messaging client. These suggestions may be selected on the context of the user performing the search, the context of the one or more other users in a message thread, the context of a message thread, and/or other context information. These suggestions may be refined as a user enters additional text in a text entry field by selecting those bot aliases that start with the text entered by the user in the text entry field.

The user interface component 923 may receive an alias initial portion in a text entry field of a messaging client. The user interface component 923 may identify the text entered in the text entry field as an alias initial portion based on it being preceded by a bot invocation symbol. However, in general, the user interface component 923 may transmit any text entered in the text entry field to the messaging system 100. The user interface component 923 may transmit the alias initial portion to the bot framework component 950. In some embodiments, the alias initial portion may be transmitted directly to the bot front-end server 955. In other embodiments, the alias initial portion may be transmitted via the client front-end server 935.

The bot framework component 950 may receive the alias initial portion of the bot alias text segment. The bot framework component 950 may match the alias initial portion against a bot alias registry to determine one or more predicted bot alias text segments and transmit the one or more predicted bot alias text segments to the sender client device 920. The sender client device 920 may display the one or more predicted bot alias text segments to the user of the sender client device 920 as to make the one or more predicted bot alias text segments available to the user for selection or use. Where the user uses one of the predicted bot aliases communicated by the one or more predicted bot alias text segments, either by selecting in an interface or typing the bot alias into the text entry field, the message 910 may therefore comprise a bot alias text segment of the one or more predicted bot alias text segments in a text portion of the message 910.

The messaging system 100 may assist users in determining bot commands. The messaging system 100 may generate suggested messaging bot commands for the user of a client device. These suggestions may be generated in response to the predicted invocation of a messaging bot, such as by entering a bot invocation symbol in a text entry field of a messaging client followed by an identified bot alias. These suggestions may be selected on the context of the user performing the search, the context of the one or more other users in a message thread, the context of a message thread, and/or other context information. The suggestion of bot commands may be performed by the services executing the bots, and as such the suggestions may be generated outside the messaging system 100 by the service providers.

These suggestions may be refined as a user enters additional text in a text entry field by selecting those bot commands that start with the text entered by the user in the text entry field. The user interface component 923 may receive a command text segment initial portion via the text entry portion of the message thread display, transmit the command text segment initial portion to the bot framework component 950, and determine one or more predicted bot command text segments by receiving the one or more predicted bot command text segments from the bot framework component 950 in response to transmitting the command text segment initial portion to the bot framework component 950.

The user interface component 923 may receive a bot invocation text segment in a text entry portion of a message thread display. Receiving this bot invocation text segment may correspond to receiving the messaging bot invocation. The user interface component 923 may transmit the bot invocation text segment to the bot framework component 950 to determine one or more predicted bot command text segments. As with suggestions for a bot alias, in some embodiments the bot invocation text segment may be transmitted to the bot framework component 950 via the client front-end server 935.

The bot framework component 950 may receive the bot invocation text segment and extract a command initial portion of the bot command text segment. Extracting the command initial portion may comprise excluding a bot invocation symbol and a bot alias from the bot invocation text segment. Alternatively, in some embodiments, the entire bot invocation text segment may be submitting to the messaging bot. The bot framework component 950 may submit the command initial portion to the messaging bot and receive one or more predicted bot command text segments from the messaging bot. The bot framework component 950 may then transmit the one or more predicted bot command text segment to the client device. If the user uses one of the predicted bot command text segments then it may appears within a text portion of a message 910.

The user interface component 923 may receive the one or more predicted bot command text segments from the bot framework component 950 and display the one or more predicted bot command text segments in the message thread display. This displaying of the one or more predicted bot command text segments may correspond to invoking the messaging bot interaction user interface.

The user interface component 923 may receive a user selection of a bot command text segment of the one or more predicted bot command text segments. The user selection may comprise selecting one of the predicted bot commands text segments in a display of the predicted bot commands segments. The user selection may comprise entering one of the predicted bot commands text segments in a text entry field of the messaging client. This bot command text segment may be transmitted to the messaging component 930 of the client front-end server 935 as a message 910.

In some cases, a configuration interface for a messaging bot may be invoked as the messaging bot interaction user interface. Invoking the message bot within the message thread may comprise the user interface component 923 receiving a messaging bot control selection in a message thread display. In response to the messaging bot control selection, the user interface component 923 may display a messaging bot interaction configuration interface in the message thread display. The user interface component 923 may receive one or more user interface selections for the messaging bot interaction configuration interface. The received one or more user interface selections may comprise the messaging bot interaction command sent via the message 910 to the messaging system 100.

In some cases, the control selected may be a service type control. A service type control indicates a category of services in which multiple providers may be available for the service. The user interface component 923 may receive a service type control selection of a service type control in the message thread display on the sender client device 920. The user interface component 923 may display a plurality of messaging bot controls in the message thread display in response to the service type control selection.

The user interface component 923 may display service performance information in association with each of the plurality of messaging bot controls. Service performance information may comprise, without limitation, one or more of estimated cost, estimated time of arrival, estimated travel time, and service availability. Service performance information may be retrieved from the bot server for the associated messaging bot by the bot framework component 950 and provided to the user interface component 923.

The use of a messaging bot, and therefore an associated service, may require an account for the user with the service. The user interface component 923 may receive a messaging bot control selection in the message thread display on the sender client device 920. The user interface component 923 may determine that the user lacks a user account for a service associated with the messaging bot and, in response, display a user account creation interface for the service in the message thread display. The user interface component 923 may receive user interactions with the user account creation interface, generate a user account creation command based on the received user interactions with the user account creation interface, and transmit the user account creation command to the service. In some embodiments, the user account creation command may be transmitted directly to the service. In other embodiments, the user account creation command may be transmitted via the bot framework component 950 and/or client front-end server 935.

Some services may require that a user phone number for the sender client device 920 be verified prior to the performance of a requested service. Where the messaging system 100 has already verified the phone number—such as by transmitting a verification code to the phone number (e.g., in a text message) and having the verification code entered in the messaging client—the messaging system 100 may attest to the verification of the phone number and therefore save the service from performing phone number verification and save the user from the effort of performing the phone number verification. As such, the messaging system 100 may verify a user phone number associated with the client device to the service in association with the user account creation command. Verifying the user phone number to the service may be operative to prevent the service from performing user phone number verification.

Where the financial information for a user is registered with the messaging system 100 the full financial information for the user may be held back from the service in order to protect the user's financial details. Instead, where a messaging bot interaction command invokes a service request with the service, the client messaging component 926 may transmit tokenized financial information for the user to the service. Tokenized financial information may empower the service to perform a financial transaction without revealing the full financial information for the user to the service. The messaging system 100 may use an irreversible transformation on the financial information to generate the tokenized financial information. In some cases, the financial information may be stored on the messaging servers 110 rather than or in addition to the sender client device 920, with the tokenized financial information generated by and sent from the messaging servers 110.

Where the user already has an account with the service, the messaging service 100 may make use of the existing account for arranging services with the service. Where the messaging system 100 does not currently have the financial information for the user, the service may provide the user's financial information to the messaging system 100 for use with financial transactions with the messaging system 100 and with other services. This providing of the financial information to the messaging system 100 may be in a complete, non-tokenized form. The user interface component 923 may receive a messaging bot control selection in the message thread display on the client device and determine that the user is associated with a user account for a service associated with the messaging bot. This determination may be made by either the messaging client on the sender client device 920 or by the messaging servers 110. Either the sender client device 920 or the bot framework component 950 may query the service for financial information for the user in response to receiving the messaging bot control selection and store the financial information in association with the user of the messaging system 100.

In addition to being extracted from the message queue 980, the message 910 may be transmitted to a recipient client device 990. The message thread display of the messaging client on the sender client device 920 may be associated with a message thread with the messaging system 100. This message thread may be associated with two or more individual users of the messaging system. The client devices for those users other than the sender client device 920, which may include the recipient client device 990, may each receive a copy of the message 910. Even where only two users are associated with the message thread, each user may be associated with more than one client device, increasing the number of client devices to receive the message 910. Where additional users are associated with the message thread, such as in a group message thread, client devices for those additional users may also receive the message 910. In general, the message 910 may be distributed to client devices through the regular operation of the messaging system 100 in addition to the message 910 being extracted for processing by a messaging bot.

Figure 10:
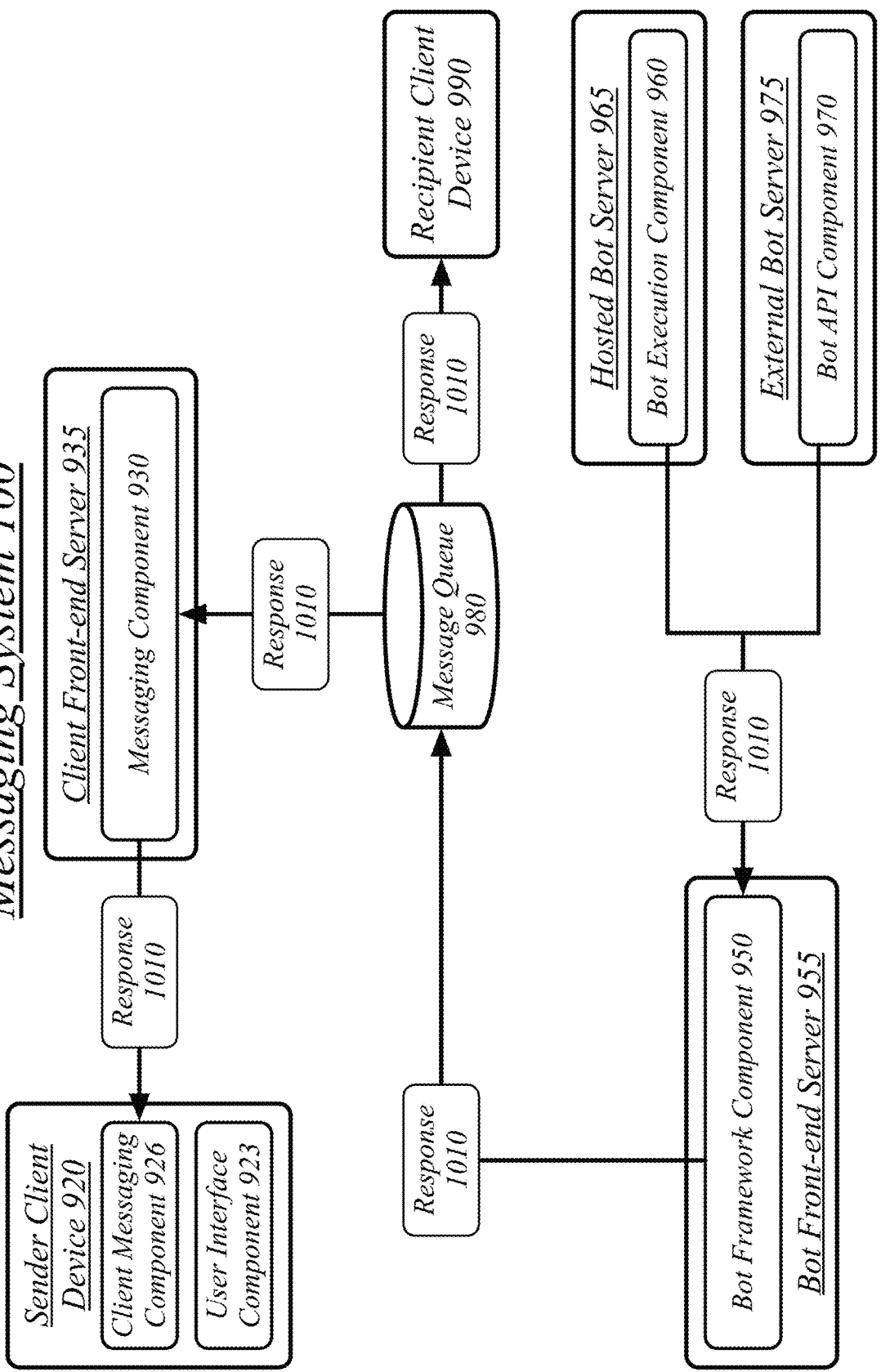
FIG. 10 illustrates an embodiment of a response to a message in a messaging system.

FIG. 10 illustrates an embodiment of a response 1010 to a message 910 in a messaging system 100.

In some cases, the messaging system 100 may generate the bot response. A bot execution component 960 on a hosted bot server 965 may generate a messaging bot response 1010 to the message 910. Some hosted bots may be developed internally to the provider of the messaging system 100, which may include, without limitation, bots for playing games, accessing messaging system services, or other services. Some hosted bots may be developed externally to the provider of the messaging system 100. These third-party bots may be hosted by the provider of the messaging system 100, using a hosted bot server 965 as a hosting platform for third-party software executing the hosted bot. A bot execution component 960 may transmit the messaging bot response 1010 to the message 910 to the bot framework component 950.

The bot framework component 950 may receive the messaging bot response 1010 to the message 910 from the bot server, whether from a hosted bot server 965 or an external bot server 975. The bot framework component 950 may receive the messaging bot response 1010 to the message 910 and insert the messaging bot response 1010 in the message queue 980. Inserting the messaging bot response 1010 in the message queue 980 may comprise adding the messaging bot response 1010 to the message queue 980 as a new update for the message queue 980. The messaging component 930 may then transmit the messaging bot response 1010 to the sender client device 920 as part of the regular operation of the message queue 980 in providing messages in the message queue 980 to the devices of its associated user.

The message 910 may have been originated in association with a message thread. In some cases, the message thread may be a one-to-bot message thread in which the user directly engages with a bot without any additional users. In other cases, the message thread may include multiple users, such as a one-to-one message thread or a group message thread. The messaging bot response 1010 may be inserted in the message queue 980 marked for display in the message thread. The messaging bot response 1010 may be inserted in message queues for each participant in a message thread marked for display in the message thread.

The message thread may be associated with two or more individual users of the message system 100. Each of the users may have a message queue associated with them with the messaging system 100. The response 1010 may be inserted into the message queues for each of the two or more users. Each of these users may be associated with at least one client device, such as by having a messaging client on each of the client devices registered with a user account for each of the users. Messaging components on client front-end servers may therefore transmit the messaging bot interaction response 1010 from the messaging system 100 to the two or more client devices.

The client messaging component 926 of the messaging client on the sender client device 920 may receive the messaging bot interaction response 1010 from the messaging system 100. The user interface component 923 of the messaging client may then display the messaging bot interaction response 1010 in the message thread display.

Figure 11:
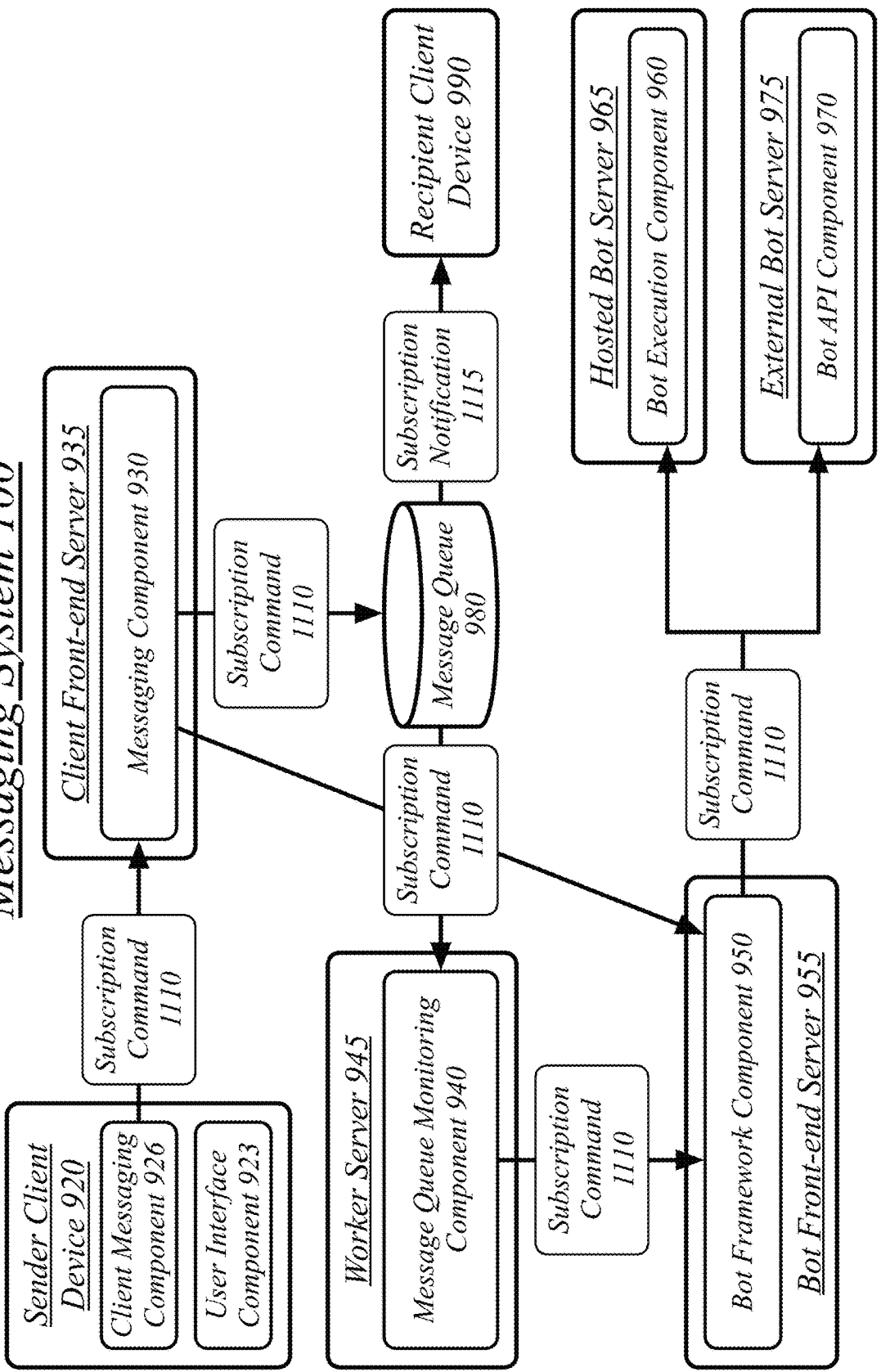
FIG. 11 illustrates an embodiment of a subscription command in a messaging system.

FIG. 11 illustrates an embodiment of a subscription command 1110 in a messaging system 100.

In most cases, bots may only be permitted add messages to a user's message queue 980 in response to a message sent out by the user to the bot. A messaging bot may be authorized to respond to a message 910 with a response 1010 because of the user sending the message 910 to the messaging bot. In some cases, the messaging bot may be authorized to send a single response 1010 to the message 910. In other cases, the messaging bot may be authorized to send responses for a limited period of time in response to the message 910.

In addition, users of the messaging system 100 may also be empowered to subscribe message threads to bots to be pushed updates from the bots. A subscription to a bot may authorize the bot to transmit messages to the subscribed message thread. This authorization may have restrictions, such as having a limited number of subscription messages that may be sent within a given time period. For example, a messaging bot may be restricted to sending at most one message a day or a specific number of messages a day. In some embodiments, subscriber thread preferences for a user may specify a restriction on the frequency with which a messaging bot may message a message thread.

A message 910 to a messaging bot may comprise a subscription command 1110, the subscription command 1110 instructing the messaging system 100 and the messaging bot that the message thread associated with the message subscription command 1110 should receive subscription messages from the messaging bot. The bot framework component 950 may subscribe the message thread to the messaging bot in response to the bot subscription command 1110. In various embodiments, the subscription command may be transmitted directly from the client messaging component 926 to the bot framework component 950, may be transmitted directly from the messaging component 930 to the bot framework component 950, or may be detected in the message queue 980 and thereby communicated to the bot framework component 950.

The subscription command 1110 may also be received by a recipient client device 990, such as every recipient client device for users involved in the message thread subscribed by the subscription command 1110. The subscription command 1110 may be communicated to a recipient client device 990 as a notification in the message thread that the message thread has been subscribed to the messaging bot. In general, any member of a message thread may subscribe the thread to a messaging bot, unsubscribe the thread from the messaging bot, or modify the subscriber thread preferences for the message thread's subscription to the messaging bot. Any of these actions may result in a notification message being added to the message queue for each member of the message thread, the notification message communicating the action, whether subscription, un-subscription, or modification of subscriber thread preferences.

Subscriptions may be maintained in a subscription registry. A subscription registry may map between thread identifiers that uniquely identify message threads within the messaging system 100 and subscriptions to messaging bots. A subscription registry may comprise, without limitation, a database or database table with a row for each registered subscription. Each registered subscription may be associated with subscriber thread preferences for that subscription.

Figure 12:
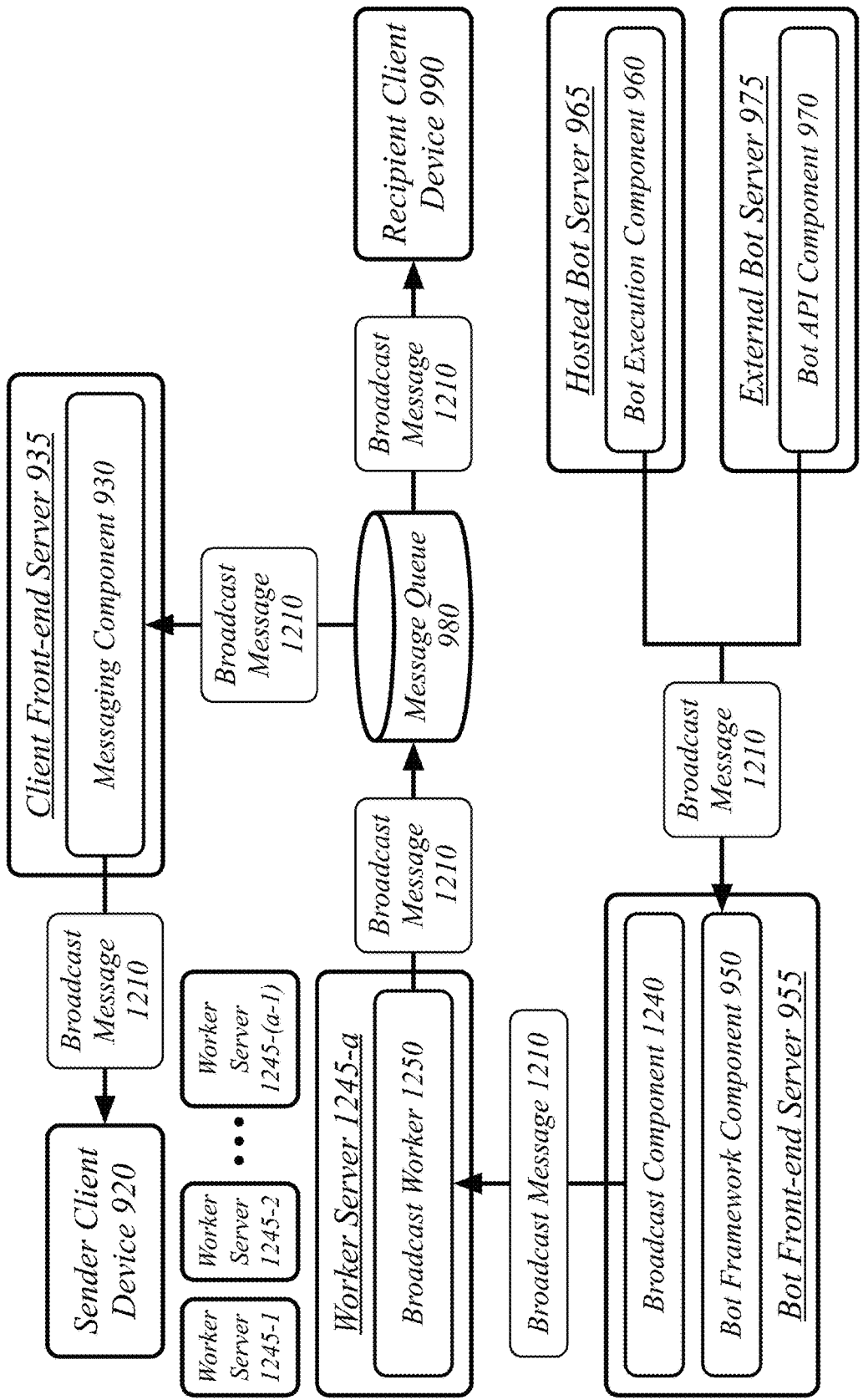
FIG. 12 illustrates an embodiment of a broadcast message in a messaging system.

FIG. 12 illustrates an embodiment of a broadcast message 1210 in a messaging system 100.

The distribution of a broadcast message 1210 to client devices may be performed in two stages to accommodate the large number of recipients a broadcast message 1210 may have and therefore to distribute the work of broadcasting the broadcast message 1210 across multiple servers and server devices. In some cases, a messaging bot may have millions or billions of subscribers, which may exceed the ability of a single server device to distribute a broadcast message 1210 with a desired responsiveness. As such, a first stage server may generate the list of potential recipients and a plurality of second stage servers may add the broadcast message 1210 to the message queues of the recipients of the broadcast message 1210.

The bot front-end server 955 may comprise a broadcast component 1240. The broadcast component 1240 may be generally arranged to generate the list of potential recipients and to assign the distribution of the broadcast message 1210 to one or more broadcast workers. The broadcast component 1240 may receive a broadcast message 1210 from a messaging bot and determine a plurality of subscriber threads for the broadcast message. Determining the plurality of subscriber threads may be based on the messaging bot, such as by comparing a messaging bot identifier for the messaging bot to the subscription registry to retrieve the thread identifiers for the message threads subscribed to the messaging bot.

The broadcast component 1240 may divide the plurality of subscriber threads into a plurality of subscriber thread chunks. Subscriber thread chunks may have a predefined size within the messaging system 100. The bot framework component 950 may generate a plurality of subscriber thread chunks based on the predefined chunk size, dividing the plurality of subscriber threads in chunks of the predefined size, with the likely exception of a single chunk of a smaller size due to the number of subscriber threads not being a precise duplicate of the predefined size. Other division schemes may be used, such as making the subscriber thread chunks of an approximately equal size—such as having a membership within one of each other—with this approximately equal size being as large as possible without exceeding the predefined size. Other division techniques may alternatively or additionally be used.

The bot framework component 950 may assign each of the plurality of subscriber threads chunks to a broadcast worker of a plurality of broadcast workers. This plurality of broadcast workers may execute on a plurality of workers servers 1245. A broadcast worker 1250 may be generally arranged to process a subscriber thread chunk and to add the broadcast message 1210 to a plurality of message queues. The plurality of broadcast workers may add the broadcast message to a plurality of message queues based on the plurality of subscriber threads chunks, wherein each of the plurality of broadcast workers adds the broadcast message to the message queues corresponding to its assigned subscriber thread chunk.

The actions of the broadcast workers may be informed by subscriber thread preferences, which may be distributed to the broadcast workers as an element of the subscriber thread chunks. The plurality of broadcast workers may retrieve a plurality of subscriber thread preferences, each of the plurality of subscriber thread preferences associated with a corresponding subscriber thread. The plurality of broadcast workers may compare each of the plurality of subscriber threads preferences to the corresponding subscriber thread to determine a plurality of selected subscriber threads, the plurality of selected subscriber threads a subset of the plurality of subscriber threads. For instance, the subscriber thread preferences may specify a portion of the day during which broadcast messages are desired, such as excluding a nighttime sleeping portion of the day. Subscriber thread preferences may specify topics, frequency, content (e.g., text, images, video), or any other element of or context for a broadcast message and specify that such broadcast messages should or should not be allowed through. Various techniques may be used for specifying and applying rules for subscriber thread preferences without limitation. The plurality of broadcast workers may then add the broadcast message to a plurality of selected message queues corresponding to the plurality of selected subscriber threads, the plurality of selected messages queues corresponding to the message queues for users that are members of the selected subscriber threads.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 13A illustrates one embodiment of a first logic flow 1300. The logic flow 1300 may be representative of some or all of the operations executed by one or more embodiments described herein.

In the illustrated embodiment shown in FIG. 13A, the logic flow 1300 may receive a messaging bot invocation in a message thread display on a client device at block 1302.

The logic flow 1300 may invoke a messaging bot interaction user interface on the client device in combination with the message thread display in response to the messaging bot invocation at block 1304.

The logic flow 1300 may receive a messaging bot interaction command via the messaging bot interaction user interface at block 1306.

The logic flow 1300 may transmit the messaging bot interaction command from the client device to a messaging system at block 1308.

The logic flow 1300 may receive a messaging bot interaction response from the messaging system at the client device at block 1310.

The logic flow 1300 may display the messaging bot interaction response in the message thread display at block 1312.

The embodiments are not limited to this example.

Figure 13B:
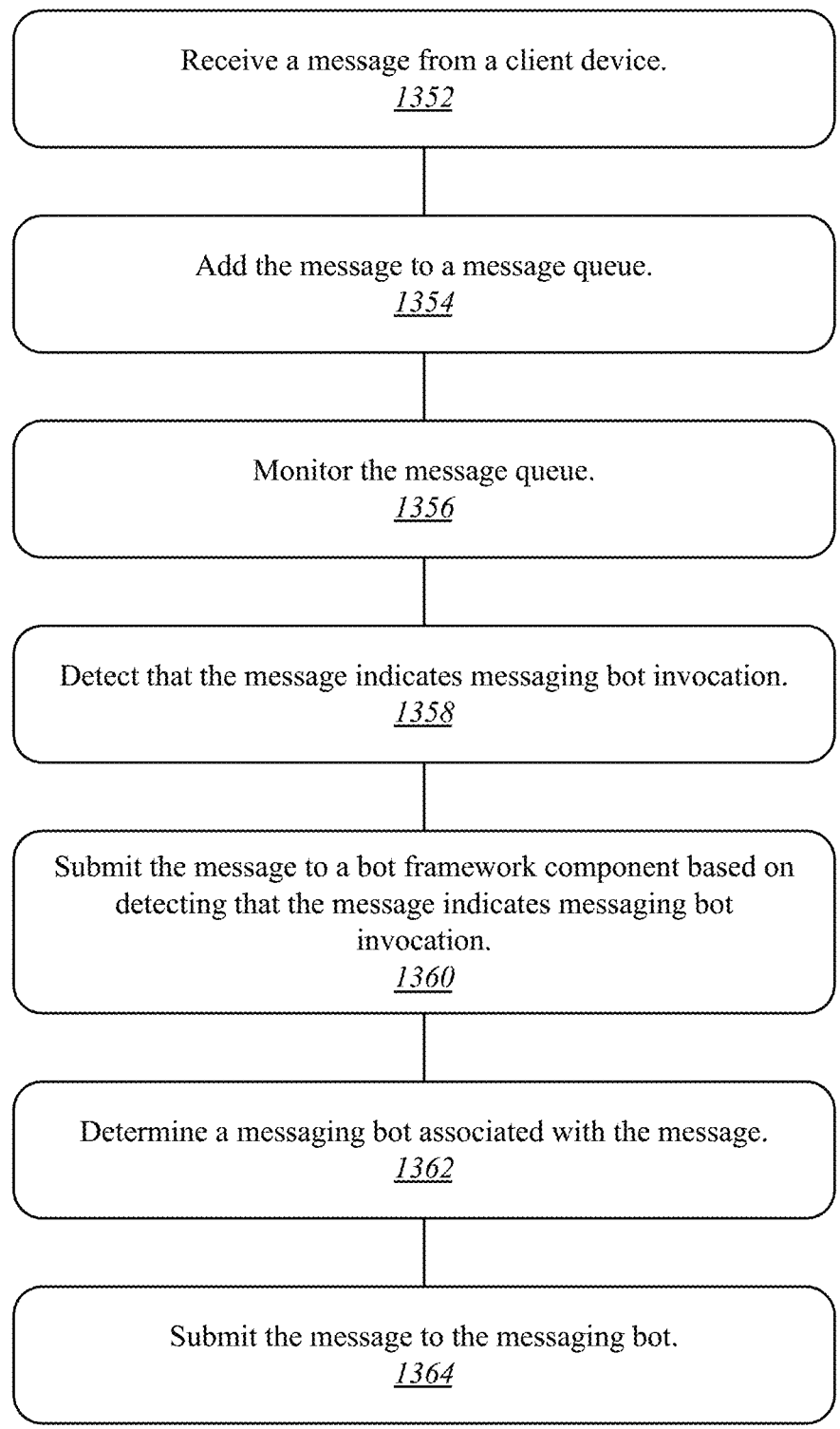
FIG. 13B illustrates an embodiment of a second logic flow for the system of FIG. 1.

FIG. 13B illustrates one embodiment of a first logic flow 1350. The logic flow 1300 may be representative of some or all of the operations executed by one or more embodiments described herein.

In the illustrated embodiment shown in FIG. 13B, the logic flow 1350 may receive a message from a client device at block 1352.

The logic flow 1350 may add the message to a message queue at block 1354.

The logic flow 1350 may monitor the message queue at block 1356.

The logic flow 1350 may detect that the message indicates messaging bot invocation at block 1358.

The logic flow 1350 may submit the message to a bot framework component based on detecting that the message indicates messaging bot invocation at block 1360.

The logic flow 1350 may determine a messaging bot associated with the message at block 1362.

The logic flow 1350 may submit the message to the messaging bot at block 1364.

The embodiments are not limited to this example.

Figure 14:
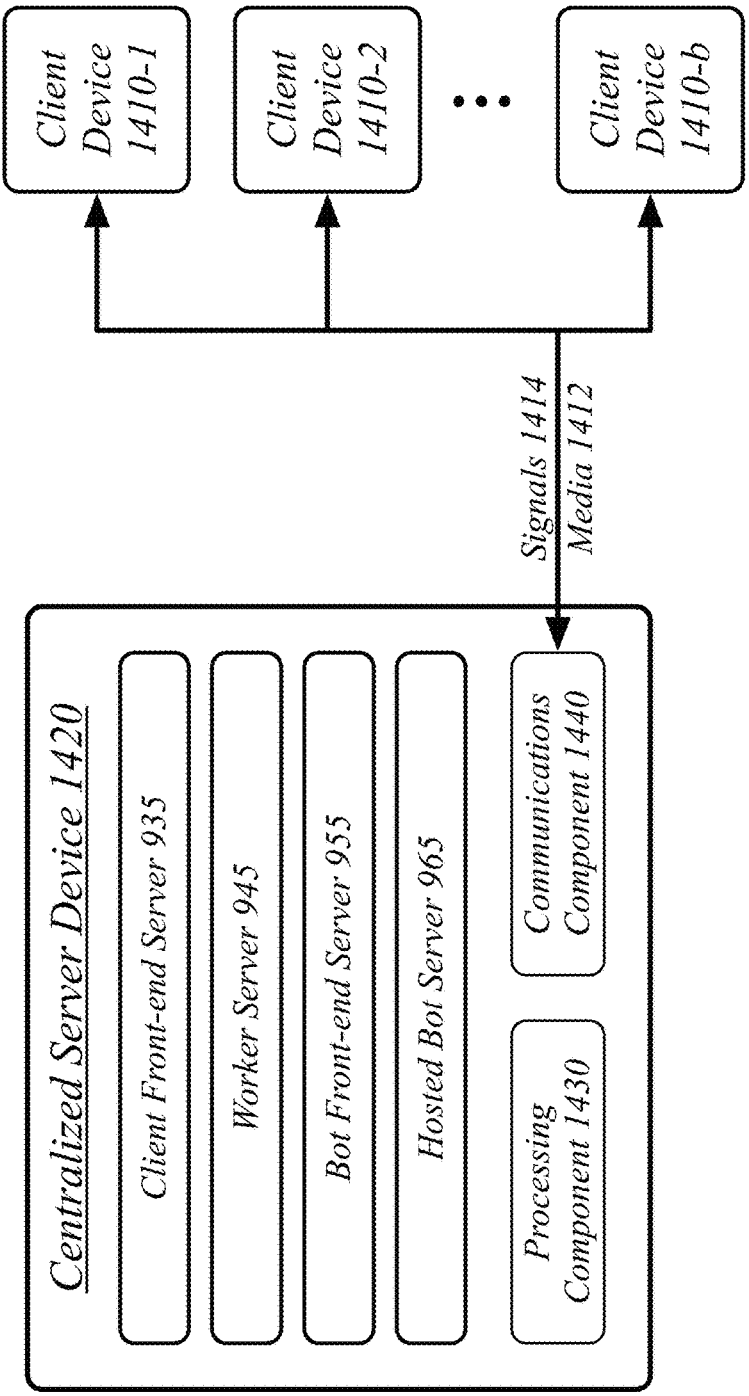
FIG. 14 illustrates an embodiment of a centralized system for the system of FIG. 1.

FIG. 14 illustrates a block diagram of a centralized system 1400. The centralized system 1400 may implement some or all of the structure and/or operations for the messaging system 100 in a single computing entity, such as entirely within a single centralized server device 1420.

The centralized server device 1420 may comprise any electronic device capable of receiving, processing, and sending information for the messaging system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 1420 may execute processing operations or logic for the messaging system 100 using a processing component 1430. The processing component 1430 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 1420 may execute communications operations or logic for the messaging system 100 using communications component 1440. The communications component 1440 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1440 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1412 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 1420 may communicate with other devices over a communications media 1412 using communications signals 1414 via the communications component 1440. The devices may be internal or external to the centralized server device 1420 as desired for a given implementation. The devices may include client devices 1410. Client devices 1410 may generally correspond to any of personal computer device 180, smartphone device 150, table device 160, client device 320, sender client device 920, and recipient client device 990.

Figure 15:
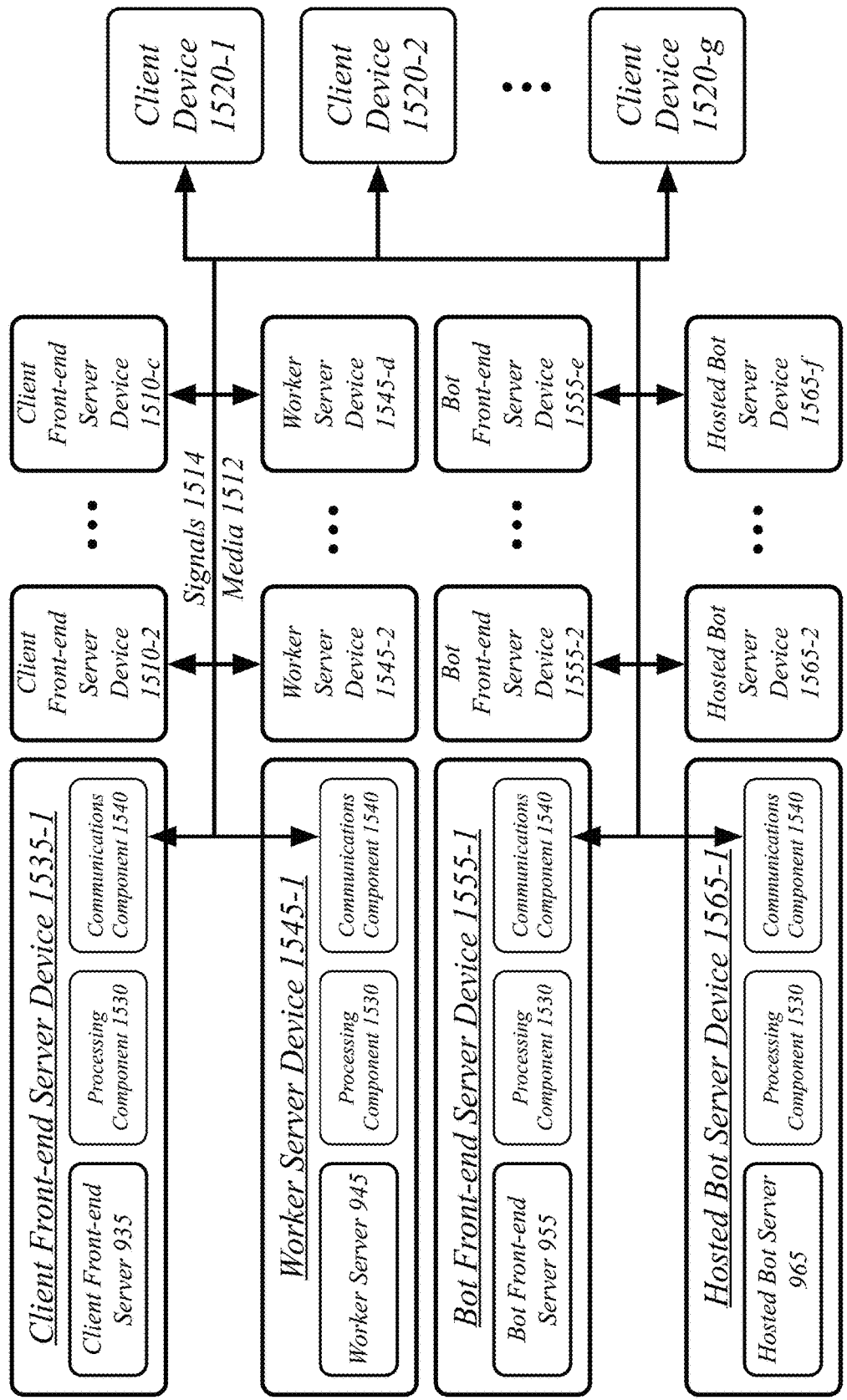
FIG. 15 illustrates an embodiment of a distributed system for the system of FIG. 1.

FIG. 15 illustrates a block diagram of a distributed system 1500. The distributed system 1500 may distribute portions of the structure and/or operations for the messaging system 100 across multiple computing entities. Examples of distributed system 1500 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1500 may comprise a plurality of server devices 1535, 1545, 1555, 1565. In general, the server devices 1535, 1545, 1555, 1565 may be the same or similar to the centralized server device 1420 as described with reference to FIG. 14. For instance, the server devices 1535, 1545, 1555, 1565 may each comprise a processing component 1530 and a communications component 1540 which are the same or similar to the processing component 1430 and the communications component 1440, respectively, as described with reference to FIG. 14. In another example, the server devices 1535, 1545, 1555, 1565 may communicate over a communications media 1512 using communications signals 1514 via the communications components 1540.

The server devices may comprise or employ one or more client programs that operate to perform various methodologies in accordance with the described embodiments. A plurality of client front-end server devices 1535 may each execute a client front-end server 935, each of the client front-end servers executing tasks as described with reference to the client front-end server 935. A plurality of worker server devices 1545 may each execute a worker server 945 or a worker server corresponding to one of the worker server 1245, each of the worker servers executing tasks as described with reference to the worker server 945 or worker servers 1245. A plurality of bot front-end server devices 1555 may each execute a bot front-end server 955, each of the bot front-end servers executing tasks as described with reference to the bot front-end server 955. A plurality of hosted bot server devices 1565 may each execute a hosted bot server 965, each of the hosted bot servers executing tasks as described with reference to the hosted bot server 965.

It will be appreciate that the relationship between servers and server devices may not be one-to-one. In some embodiments, a single server device may execute multiple servers. Similarly, in some embodiments, server devices may be transitioned between roles, and therefore transitioned between the server(s) they execute, based on the demands of the messaging system 100. In general, various techniques may be used to distribute server tasks across a plurality of server devices.

Client devices 1520 may generally correspond to any of personal computer device 180, smartphone device 150, table device 160, client device 320, sender client device 920, recipient client device 990, and client devices 1410.

Figure 16:
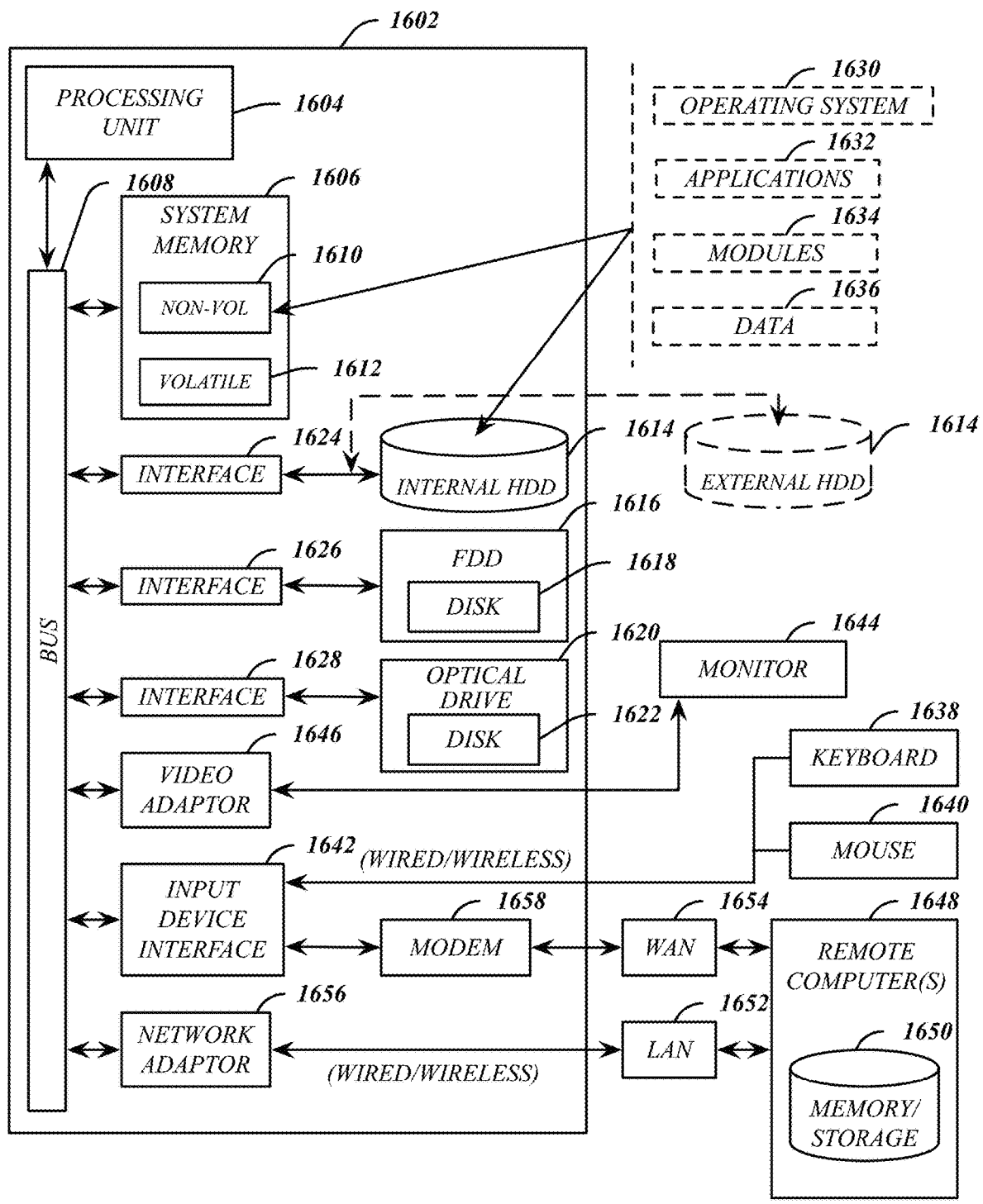
FIG. 16 illustrates an embodiment of a computing architecture.

FIG. 16 illustrates an embodiment of an exemplary computing architecture 1600 suitable for implementing various embodiments as previously described. In one embodiment, the computing architecture 1600 may comprise or be implemented as part of an electronic device. Examples of an electronic device may include those described with reference to FIG. 14, 15, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1600 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 1600.

As shown in FIG. 16, the computing architecture 1600 comprises a processing unit 1604, a system memory 1606 and a system bus 1608. The processing unit 1604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1604.

The system bus 1608 provides an interface for system components including, but not limited to, the system memory 1606 to the processing unit 1604. The system bus 1608 can be any of several types of bus structure that may further interconnect to a memory bus (with or without a memory controller), a peripheral bus, and a local bus using any of a variety of commercially available bus architectures. Interface adapters may connect to the system bus 1608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 16, the system memory 1606 can include non-volatile memory 1610 and/or volatile memory 1612. A basic input/output system (BIOS) can be stored in the non-volatile memory 1610.

The computer 1602 may include various types of computer-readable storage media in the form of one or more lower speed memory units, including an internal (or external) hard disk drive (HDD) 1614, a magnetic floppy disk drive (FDD) 1616 to read from or write to a removable magnetic disk 1618, and an optical disk drive 1620 to read from or write to a removable optical disk 1622 (e.g., a CD-ROM or DVD). The HDD 1614, FDD 1616 and optical disk drive 1620 can be connected to the system bus 1608 by a HDD interface 1624, an FDD interface 1626 and an optical drive interface 1628, respectively. The HDD interface 1624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1610, 1612, including an operating system 1630, one or more application programs 1632, other program modules 1634, and program data 1636. In one embodiment, the one or more application programs 1632, other program modules 1634, and program data 1636 can include, for example, the various applications and/or components of the messaging system 100.

A user can enter commands and information into the computer 1602 through one or more wire/wireless input devices, for example, a keyboard 1638 and a pointing device, such as a mouse 1640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1604 through an input device interface 1642 that is coupled to the system bus 1608, but can be connected by other interfaces such as a parallel port, IEEE 1394 serial port, a game port, a USB port, an IR interface, and so forth.

A monitor 1644 or other type of display device is also connected to the system bus 1608 via an interface, such as a video adaptor 1646. The monitor 1644 may be internal or external to the computer 1602. In addition to the monitor 1644, a computer typically includes other peripheral output devices, such as speakers, printers, and so forth.

The computer 1602 may operate in a networked environment using logical connections via wire and/or wireless communications to one or more remote computers, such as a remote computer 1648. The remote computer 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wire/wireless connectivity to a local area network (LAN) 1652 and/or larger networks, for example, a wide area network (WAN) 1654. Such LAN and WAN networking environments are commonplace in offices and companies, and facilitate enterprise-wide computer networks, such as intranets, all of which may connect to a global communications network, for example, the Internet.

When used in a LAN networking environment, the computer 1602 is connected to the LAN 1652 through a wire and/or wireless communication network interface or adaptor 1656. The adaptor 1656 can facilitate wire and/or wireless communications to the LAN 1652, which may also include a wireless access point disposed thereon for communicating with the wireless functionality of the adaptor 1656.

When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wire and/or wireless device, connects to the system bus 1608 via the input device interface 1642. In a networked environment, program modules depicted relative to the computer 1602, or portions thereof, can be stored in the remote memory/storage device 1650. It will be appreciated that the network connections shown are exemplary and other means of establishing a communications link between the computers can be used.

The computer 1602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.16x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 17:
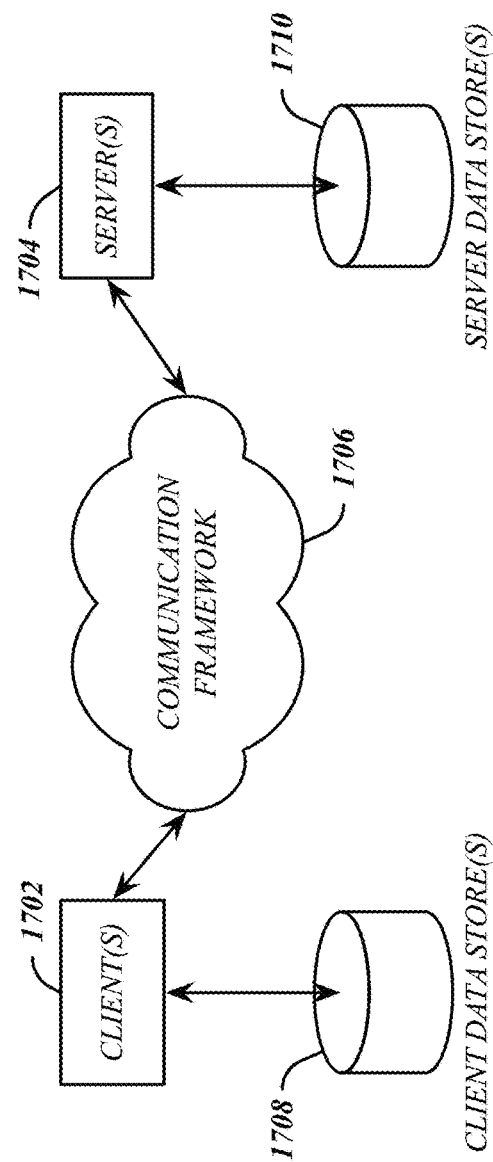
FIG. 17 illustrates an embodiment of a communications architecture.

FIG. 17 illustrates a block diagram of an exemplary communications architecture 1700 suitable for implementing various embodiments as previously described. The communications architecture 1700 includes various common communications elements, such as a transmitter, receiver, transceiver, radio, network interface, baseband processor, antenna, amplifiers, filters, power supplies, and so forth. The embodiments, however, are not limited to implementation by the communications architecture 1700.

As shown in FIG. 17, the communications architecture 1700 comprises includes one or more clients 1702 and servers 1704. The clients 1702 may implement any of personal computer device 180, smartphone device 150, table device 160, client device 320, sender client device 920, recipient client device 990, client devices 1410, and client devices 1520. The servers 1704 may implement any of centralized server device 1420 and client front-end server devices 1535, worker server devices 1545, bot front-end server devices 1555, and hosted bot server devices 1565. The clients 1702 and the servers 1704 are operatively connected to one or more respective client data stores 1708 and server data stores 1710 that can be employed to store information local to the respective clients 1702 and servers 1704, such as cookies and/or associated contextual information.

The clients 1702 and the servers 1704 may communicate information between each other using a communication framework 1706. The communications framework 1706 may implement any well-known communications techniques and protocols. The communications framework 1706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1702 and the servers 1704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 18:
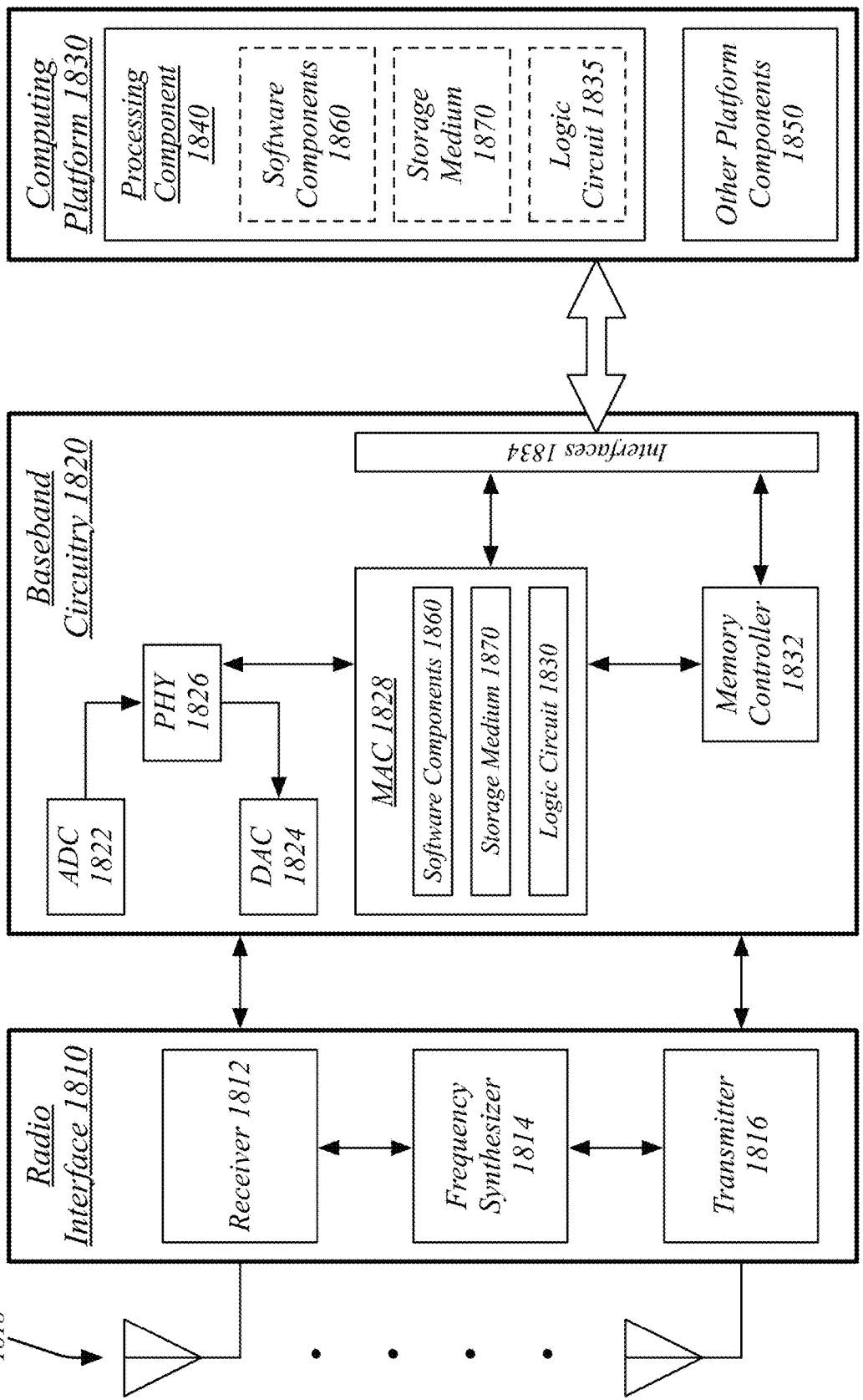
FIG. 18 illustrates an embodiment of a radio device architecture.

FIG. 18 illustrates an embodiment of a device 1800 for use in a multicarrier OFDM system, such as the messaging system 100. Device 1800 may implement, for example, software components 1860 as described with reference to messaging system 100 and/or a logic circuit 1835. The logic circuit 1835 may include physical circuits to perform operations described for the messaging system 100. As shown in FIG. 18, device 1800 may include a radio interface 1810, baseband circuitry 1820, and computing platform 1830, although embodiments are not limited to this configuration.

The device 1800 may implement some or all of the structure and/or operations for the messaging system 100 and/or logic circuit 1835 in a single computing entity, such as entirely within a single device. Alternatively, the device 1800 may distribute portions of the structure and/or operations for the messaging system 100 and/or logic circuit 1835 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1810 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1810 may include, for example, a receiver 1812, a transmitter 1816 and/or a frequency synthesizer 1814. Radio interface 1810 may include bias controls, a crystal oscillator and/or one or more antennas 1818. In another embodiment, radio interface 1810 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1820 may communicate with radio interface 1810 to process receive and/or transmit signals and may include, for example, an analog-to-digital converter 1822 for down converting received signals, a digital-to-analog converter 1824 for up converting signals for transmission. Further, baseband circuitry 1820 may include a baseband or physical layer (PHY) processing circuit 1856 for PHY link layer processing of respective receive/transmit signals. Baseband circuitry 1820 may include, for example, a processing circuit 1828 for medium access control (MAC)/data link layer processing. Baseband circuitry 1820 may include a memory controller 1832 for communicating with processing circuit 1828 and/or a computing platform 1830, for example, via one or more interfaces 1834.

In some embodiments, PHY processing circuit 1826 may include a frame construction and/or detection module, in combination with additional circuitry such as a buffer memory, to construct and/or deconstruct communication frames, such as radio frames. Alternatively or in addition, MAC processing circuit 1828 may share processing for certain of these functions or perform these processes independent of PHY processing circuit 1826. In some embodiments, MAC and PHY processing may be integrated into a single circuit.

The computing platform 1830 may provide computing functionality for the device 1800. As shown, the computing platform 1830 may include a processing component 1840. In addition to, or alternatively of, the baseband circuitry 1820, the device 1800 may execute processing operations or logic for the messaging system 100 and logic circuit 1835 using the processing component 1840. The processing component 1840 (and/or PHY 1826 and/or MAC 1828) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1830 may further include other platform components 1850. Other platform components 1850 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1800 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1800 described herein, may be included or omitted in various embodiments of device 1800, as suitably desired. In some embodiments, device 1800 may be configured to be compatible with protocols and frequencies associated one or more of the 3GPP LTE Specifications and/or IEEE 1802.16 Standards for WMANs, and/or other broadband wireless networks, cited herein, although the embodiments are not limited in this respect.

Embodiments of device 1800 may be implemented using single input single output (SISO) architectures. However, certain implementations may include multiple antennas (e.g., antennas 1818) for transmission and/or reception using adaptive antenna techniques for beamforming or spatial division multiple access (SDMA) and/or using MIMO communication techniques.

The components and features of device 1800 may be implemented using any combination of discrete circuitry, application specific integrated circuits (ASICs), logic gates and/or single chip architectures. Further, the features of device 1800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1800 shown in the block diagram of FIG. 18 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a messaging bot invocation in a message thread display on a client device; invoking a messaging bot interaction user interface on the client device in combination with the message thread display in response to the messaging bot invocation; receiving a messaging bot interaction command via the messaging bot interaction user interface; transmitting the messaging bot interaction command from the client device to a messaging system; receiving a messaging bot interaction response from the messaging system at the client device; displaying the messaging bot interaction response in the message thread display.

A computer-implemented method may further comprise receiving a bot invocation text segment in a text entry portion of the message thread display, wherein receiving the bot invocation text segment comprises receiving the messaging bot invocation; determining one or more predicted bot command text segments; displaying the one or more predicted bot command text segments in the message thread display, wherein displaying the one or more predicted bot command text segments comprises invoking the messaging bot interaction user interface; receiving a user selection of a bot command text segment of the one or more predicted bot command text segments; and transmitting the bot command text segment corresponding to the user selection from the client device to the messaging system, wherein transmitting the bot command text segment to the messaging system comprises transmitting the messaging bot interaction command from the client device to a messaging system.

A computer-implemented method may further comprise receiving a command text segment initial portion via the text entry portion of the message thread display; transmitting the command text segment initial portion to the messaging system; and determining the one or more predicted bot command text segments by receiving the one or more predicted bot command text segments from the messaging system in response to transmitting the command text segment initial portion to the messaging system.

A computer-implemented method may further comprise receiving a messaging bot control selection in the message thread display on the client device, wherein receiving the messaging bot control selection comprises receiving the messaging bot invocation, the messaging bot control selection for a messaging bot control associated with a messaging bot; displaying a messaging bot interaction configuration interface in the message thread display, wherein displaying the messaging bot interaction configuration interface comprises invoking the messaging bot interaction user interface; and receiving one or more user interface selections for the messaging bot interaction configuration interface, wherein receiving the one or more user interface selections comprises receiving the messaging bot interaction command.

A computer-implemented method may further comprise receiving a service type control selection of a service type control in the message thread display on the client device; displaying a plurality of messaging bot controls in the message thread display in response to the service type control selection, the plurality of messaging bot controls comprising the messaging bot control; and displaying service performance information in association with each of the plurality of messaging bot controls, the service performance information comprising one or more of estimated cost, estimated time of arrival, estimated travel time, and service availability.

A computer-implemented method may further comprise the client device associated with a user of the messaging system, further comprising: receiving a messaging bot control selection in the message thread display on the client device, wherein receiving the messaging bot control selection comprises receiving the messaging bot invocation, the messaging bot control selection for a messaging bot control associated with a messaging bot; determining that the user lacks a user account for a service associated with the messaging bot; displaying a user account creation interface for the service in the message thread display; receiving user interactions with the user account creation interface; generating a user account creation command based on the received user interactions with the user account creation interface; and transmitting the user account creation command to the service.

A computer-implemented method may further comprise verifying a user phone number associated with the client device to the service in association with the user account creation command, wherein verifying the user phone number to the service is operative to prevent the service from performing user phone number verification.

A computer-implemented method may further comprise the client device associated with a user of the messaging system, wherein transmitting the messaging bot interaction command from the client device to the messaging system invokes a service request with a service, further comprising: transmitting tokenized financial information for the user to the service.

A computer-implemented method may further comprise the client device associated with a user of the messaging system, further comprising: receiving a messaging bot control selection in the message thread display on the client device, wherein receiving the messaging bot control selection comprises receiving the messaging bot invocation, the messaging bot control selection for a messaging bot control associated with a messaging bot; determining that the user is associated with a user account for a service associated with the messaging bot; querying the service for financial information for the user in response to receiving the messaging bot control selection; and storing the financial information in association with the user of the messaging system.

A computer-implemented method may further comprise the message thread display associated with a message thread with the messaging system, the message thread associated with two or more individual users of the messaging system.

A computer-implemented method may further comprise the two or more individual users associated with two or more client devices, the two or more client devices comprising the client device, further comprising: transmitting the messaging bot interaction response from the messaging system to the two or more client devices.

An apparatus may comprise a processor circuit on a device; a user interface component operative on the processor circuit to receive a messaging bot invocation in a message thread display on a client device; invoke a messaging bot interaction user interface on the client device in combination with the message thread display in response to the messaging bot invocation; receive a messaging bot interaction command via the messaging bot interaction user interface; and display a messaging bot interaction response in the message thread display; and a client messaging component operative on the processor circuit to transmit the messaging bot interaction command from the client device to a messaging system; and receive the messaging bot interaction response from the messaging system at the client device. The apparatus may be operative to implement any of the computer-implemented methods described herein.

A computer-implemented method may comprise receiving a message from a client device; adding the message to a message queue; monitoring the message queue; detecting that the message indicates messaging bot invocation; and submitting the message to a bot framework component based on detecting that the message indicates messaging bot invocation; determining a messaging bot associated with the message; and submitting the message to the messaging bot.

A computer-implemented method may further comprise the message comprising a text content portion, further comprising: detecting a bot invocation symbol in the text content portion of the message; and detecting that the message indicates messaging bot invocation based on detecting the bot invocation symbol.

A computer-implemented method may further comprise the message comprising a metadata portion, further comprising: detecting a bot invocation flag in the metadata portion of the message; and detecting that the message indicates messaging bot invocation based on detecting the bot invocation flag.

A computer-implemented method may further comprise submitting the message to the messaging bot by transmitting the message to a bot server associated with the messaging bot.

A computer-implemented method may further comprise receiving a messaging bot response to the message from the bot server.

A computer-implemented method may further comprise generating a messaging bot response to the message; and transmitting the messaging bot response to the message to the bot framework component.

A computer-implemented method may further comprise receiving a messaging bot response to the message; and inserting the messaging bot response in the message queue.

A computer-implemented method may further comprise transmitting the messaging bot response to the client device.

A computer-implemented method may further comprise the message associated with a message thread, the messaging bot response inserted in the message queue marked for display in the message thread.

A computer-implemented method may further comprise the message thread associated with two or more individual users.

A computer-implemented method may further comprise the message comprising a text portion, the text portion comprising a bot alias text segment, further comprising: receiving an alias initial portion of the bot alias text segment; matching the alias initial portion against a bot alias registry to determine one or more predicted bot alias text segments, the one or more predicted bot alias text segments comprising the bot alias text segment; and transmitting the one or more predicted bot alias text segments to the client device.

A computer-implemented method may further comprise the message comprising a text portion, the text portion comprising a bot command text segment, further comprising: receiving a command initial portion of the bot command text segment; submitting the command initial portion to the messaging bot; receiving one or more predicted bot command text segments from the messaging bot, the one or more predicted bot command text segments comprising the bot command text segment; and transmitting the one or more predicted bot command text segment to the client device.

A computer-implemented method may further comprise the message associated with a message thread, the message comprising a bot subscription command, further comprising: subscribing the message thread to the messaging bot in response to the bot subscription command; receiving a broadcast message from the messaging bot; determining a plurality of subscriber threads for the broadcast message based on the messaging bot, the plurality of subscriber threads comprising the message thread; dividing the plurality of subscriber threads into a plurality of subscriber thread chunks; assigning each of the plurality of subscriber threads chunks to a broadcast worker of a plurality of broadcast workers; and adding the broadcast message to a plurality of message queues based on the plurality of subscriber threads chunks by the plurality of broadcast workers, the plurality of message queues comprising the message queue.

A computer-implemented method may further comprise retrieving a plurality of subscriber thread preferences, each of the plurality of subscriber thread preferences associated with a corresponding subscriber thread; comparing each of the plurality of subscriber threads preferences to the corresponding subscriber thread to determine a plurality of selected subscriber threads, the plurality of selected subscriber threads a subset of the plurality of subscriber threads; and adding the broadcast message to a plurality of selected message queues corresponding to the plurality of selected subscriber threads.

An apparatus may comprise a processor circuit on a device; a messaging component operative on the processor circuit to receive a message from a client device; and add the message to a message queue; a message queue monitoring component operative on the processor circuit to monitor the message queue; detect that the message indicates messaging bot invocation; and submit the message to a bot framework component based on detecting that the message indicates messaging bot invocation; and the bot framework component operative to determine a messaging bot associated with the message; and submit the message to the messaging bot. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
providing, at a messaging system, a message queue for messages, wherein messages in the message queue that are directed to one or more of a plurality of messaging bots comprise a respective bot alias of a plurality of bot aliases;
determining, for a first message comprising a predetermined bot invocation symbol followed by a bot alias in the message queue, that the bot alias of the first message corresponds to a name registered with the messaging system for a first messaging bot of the plurality of messaging bots;
submitting the first message comprising the bot alias to the first messaging bot, wherein the first message comprises a bot command text segment, wherein the bot command text segment includes a first predicted bot command text segment, wherein the first predicted bot command text segment is received from the first messaging bot based on a command initial text portion received from a messaging application on a client device;
receiving a response from the first messaging bot; and
adding the response to the message queue for delivery to the messaging application on the client device.

2. The method of claim 1, the first message comprising a text content portion, further comprising:
detecting the predetermined bot invocation symbol followed by the bot alias in the text content portion of the first message; and
detecting that the first message indicates messaging bot invocation based on detecting the predetermined bot invocation symbol followed by the bot alias.

3. The method of claim 1, the first message associated with a message thread, the response from the first messaging bot inserted in the message queue marked for display in the message thread.

4. The method of claim 1, the first message comprising a text portion, the text portion comprising the bot command text segment, further comprising:
receiving, from the client device, the command initial text portion of the bot command text segment;
submitting the command initial text portion to the first messaging bot;
receiving a plurality of predicted bot command text segments including the first predicted bot command text segment from the first messaging bot, wherein the command initial text portion is a respective portion of each of the plurality of predicted bot command text segments, wherein each of the plurality of predicted command bot text segments comprises a respective command compatible with the first messaging bot; and
transmitting the plurality of predicted bot command text segments to the client device.

5. The method of claim 1, the first message associated with a message thread, the first message comprising a bot subscription command, further comprising:
subscribing the message thread to the first messaging bot in response to the bot subscription command;
receiving a broadcast message from the first messaging bot;
determining a plurality of subscriber threads for the broadcast message based on the first messaging bot, the plurality of subscriber threads comprising the message thread;
dividing the plurality of subscriber threads into a plurality of subscriber thread chunks;
assigning each of the plurality of subscriber thread chunks to a broadcast worker of a plurality of broadcast workers; and adding the broadcast message to a plurality of message queues based on the plurality of subscriber thread chunks by the plurality of broadcast workers, the plurality of message queues comprising the message queue.

6. The method of claim 1, further comprising:
determining, for a second message in the message queue, that the bot alias of the second message corresponds to a name registered with the messaging system for a second messaging bot of the plurality of messaging bots;
submitting the second message to the second messaging bot;
receiving a response from the second messaging bot; and
adding the response from the second messaging bot to the message queue for delivery to the messaging application on the client device.

7. At least one non-transitory computer-readable storage medium comprising instructions that, when executed, cause a processor to:
provide, at a messaging system, a message queue for messages, wherein messages in the message queue that are directed to one or more of a plurality of messaging bots comprise a respective bot alias of a plurality of bot aliases;
determine, for a first message comprising a predetermined bot invocation symbol followed by a bot alias in the message queue, that the bot alias of the first message corresponds to a name registered with the messaging system for a first messaging bot of the plurality of messaging bots;
submit the first message comprising the bot alias to the first messaging bot, wherein the first message comprises a bot command text segment, wherein the bot command text segment includes a first predicted bot command text segment, wherein the first predicted bot command text segment is received from the first messaging bot based on a command initial text portion received from a messaging application on a client device;
receive a response from the first messaging bot; and
add the response to the message queue for delivery to the messaging application on the client device.

8. The non-transitory computer-readable storage medium of claim 7, the first message comprising a text content portion, comprising further instructions that, when executed, cause the processor to:
detect the predetermined bot invocation symbol followed by the bot alias in the text content portion of the first message; and
detect that the first message indicates messaging bot invocation based on detecting the bot invocation symbol.

9. The non-transitory computer-readable storage medium of claim 7, the first message comprising a text portion, the text portion comprising a bot command text segment, comprising further instructions that, when executed, cause the processor to:
receive, from the client device, the command initial text portion of the bot command text segment;
submit the command initial text portion to the first messaging bot;
receive a plurality of predicted bot command text segments including the first predicted bot command text segment from the first messaging bot, wherein the command initial text portion is a respective portion of each of the plurality of predicted bot command text segments, wherein each of the plurality of predicted command bot text segments comprises a respective command compatible with the first messaging bot; and
transmit the plurality of predicted bot command text segments to the client device.

10. The non-transitory computer-readable storage medium of claim 7, the first message associated with a message thread, the first message comprising a bot subscription command, comprising further instructions that, when executed, cause the processor to:
subscribe the message thread to the first messaging bot in response to the bot subscription command;
receive a broadcast message from the first messaging bot;
determine a plurality of subscriber threads for the broadcast message based on the first messaging bot, the plurality of subscriber threads comprising the message thread;
divide the plurality of subscriber threads into a plurality of subscriber thread chunks;
assign each of the plurality of subscriber thread chunks to a broadcast worker of a plurality of broadcast workers; and
add the broadcast message to a plurality of message queues based on the plurality of subscriber thread chunks by the plurality of broadcast workers, the plurality of message queues comprising the message queue.

11. An apparatus, comprising:
a processor; and
memory storing instructions which when executed by the processor cause the processor to:
provide, at a messaging system, a message queue for messages, wherein messages in the message queue that are directed to one or more of a plurality of messaging bots comprise a respective bot alias of a plurality of bot aliases;
determine, for a first message comprising a predetermined bot invocation symbol followed by a bot alias in the message queue, that the bot alias of the first message corresponds to a name registered with the messaging system for a first messaging bot of the plurality of messaging bots;
submit the first message to the first messaging bot, wherein the first message comprises a bot command text segment, wherein the bot command text segment includes a first predicted bot command text segment, wherein the first predicted bot command text segment is received from the first messaging bot based on a command initial text portion received from a messaging application on a client device;
receive a response from the first messaging bot; and
add the response to the message queue for delivery to the messaging application on the client device.

12. The apparatus of claim 11, the first message comprising a text content portion, the memory storing instructions which when executed by the processor cause the processor to:
detect the predetermined bot invocation symbol followed by the bot alias in the text content portion of the first message; and
detect that the first message indicates messaging bot invocation based on detecting the bot invocation symbol.

13. The apparatus of claim 11, the first message associated with a message thread, the response from the first messaging bot inserted in the message queue marked for display in the message thread.

14. The apparatus of claim 11, the first message comprising a text portion, the text portion comprising a bot command text segment, the memory storing instructions which when executed by the processor cause the processor to:

receive, from the client device, the command initial text portion of the bot command text segment;

submit the command initial text portion to the first messaging bot;

receive a plurality of predicted bot command text segments including the first predicted bot command text segment from the first messaging bot, wherein the command initial text portion is a respective portion of each of the plurality of predicted bot command text segments, wherein each of the plurality of predicted command bot text segments comprises a respective command compatible with the first messaging bot; and transmit the plurality of predicted bot command text segments to the client device.

15. The apparatus of claim 11, the first message associated with a message thread, the first message comprising a bot subscription command, the memory storing instructions which when executed by the processor cause the processor to:

subscribe the message thread to the first messaging bot in response to the bot subscription command;

receive a broadcast message from the first messaging bot;

determine a plurality of subscriber threads for the broadcast message based on the first messaging bot, the plurality of subscriber threads comprising the message thread;

divide the plurality of subscriber threads into a plurality of subscriber thread chunks;

assign each of the plurality of subscriber thread chunks to a broadcast worker of a plurality of broadcast workers; and add the broadcast message to a plurality of message queues based on the plurality of subscriber thread chunks by the plurality of broadcast workers, the plurality of message queues comprising the message queue.

* * * * *